US008666414B2

(12) United States Patent
Aramaki et al.

(10) Patent No.: US 8,666,414 B2
(45) Date of Patent: Mar. 4, 2014

(54) MOBILE COMMUNICATION TERMINAL AND COMMUNICATION DEVICE

(75) Inventors: Takashi Aramaki, Kanagawa (JP); Jun Hirano, Kanagawa (JP); Takako Hori, Kanagawa (JP); Hong Cheng, Singapore (SG); Tien Ming Benjamin Koh, Singapore (SG); Shivanajay Marwaha, Singapore (SG); Chan Wah Ng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 525 days.

(21) Appl. No.: 12/596,361

(22) PCT Filed: Apr. 25, 2008

(86) PCT No.: PCT/JP2008/001087
§ 371 (c)(1),
(2), (4) Date: Oct. 16, 2009

(87) PCT Pub. No.: WO2008/139707
PCT Pub. Date: Nov. 20, 2008

(65) Prior Publication Data
US 2010/0135248 A1      Jun. 3, 2010

(30) Foreign Application Priority Data

Apr. 27, 2007 (JP) ................................ 2007-119959
Nov. 19, 2007 (JP) ................................ 2007-299483
Mar. 10, 2008 (JP) ................................ 2008-059666

(51) Int. Cl.
*H04W 36/00* (2009.01)

(52) U.S. Cl.
USPC ........................... 455/436; 455/437; 455/439

(58) Field of Classification Search
USPC .......................................... 455/436, 437, 439
See application file for complete search history.

(56) References Cited

U.S. PATENT DOCUMENTS 5,640,679 A *  6/1997  Lundqvist et al. ............ 455/525
7,215,956 B2 *  5/2007  Liu et al. ....................... 455/434

(Continued)

FOREIGN PATENT DOCUMENTS

| JP | 2004-56427  | 2/2004 |
| JP | 2004-528761 | 9/2004 |

(Continued)

OTHER PUBLICATIONS

International Search Report dated Aug. 19, 2008.

(Continued)

*Primary Examiner* — Kent Chang
*Assistant Examiner* — Scott Au
(74) *Attorney, Agent, or Firm* — Seed IP Law Group PLLC

(57) ABSTRACT

Disclosed is a technique for reducing delay when a mobile communication terminal starts communication and reducing consumption of a power resource of the mobile communication terminal. An MN (mobile node) (1012) has plural interfaces (IF-1 (1030) and IF-2 (1028)). One interface IF-1 is connected to a connection point (serving PoA (1008)). When switching over from communication using the IF-1 to communication using the IF-2, the MN transmits a paging request message via the IF-1 and the serving PoA to a connection point (target PoA (1010)) attempted to connect using the IF-2. The target PoA that has received the paging request message reduces a beacon transmission cycle and sets transmission slots for the MN so that the connection of the MN can be established efficiently.

18 Claims, 20 Drawing Sheets

(56) References Cited

U.S. PATENT DOCUMENTS

| | | |
|---|---|---|
| 7,418,264 B2 * | 8/2008 | Kim ............................. 455/436 |
| 7,894,823 B2 * | 2/2011 | Alemany et al. .............. 455/453 |
| 2002/0021718 A1 * | 2/2002 | Kerhuel et al. ............... 370/509 |
| 2002/0136226 A1 | 9/2002 | Christoffel |
| 2004/0185853 A1 * | 9/2004 | Kim et al. ..................... 455/438 |
| 2004/0240411 A1 | 12/2004 | Suzuki |
| 2006/0077932 A1 | 4/2006 | Takeda |
| 2007/0091846 A1 * | 4/2007 | Kim et al. ..................... 370/331 |
| 2007/0155388 A1 * | 7/2007 | Petrovic et al. ............... 455/442 |
| 2007/0238463 A1 * | 10/2007 | Ogami ........................... 455/436 |
| 2008/0064401 A1 * | 3/2008 | Forssell et al. ............... 455/436 |

FOREIGN PATENT DOCUMENTS

| | | |
|---|---|---|
| JP | 2006-115453 | 4/2006 |
| JP | 2006-517753 | 7/2006 |

OTHER PUBLICATIONS

"Draft IEEE Standard for Local and Metropolitan Area Networks: Media Independent Handover Services," IEEE P802.21 Specification Draft 02.00, Sep. 2006, 257 pages.

"$3^{rd}$ Generation Partnership Project; Technical Specification Group Radio Access Network and Evolved Universal Terrestrial Radio Access (E-UTRA) and Evolved Universal Terrestrial Radio Access Network (E-UTRAN), Overall Description, Stage 2," 3GPP TS 36.300 v8.3.0, Dec. 2007, p. 1-120.

"Network Transport QoS for Home NodeBs (HNB)," 3GPP TSG RAN WG3 Meeting #56, Kobe, Japan, May 2007, pp. 1-3.

* cited by examiner

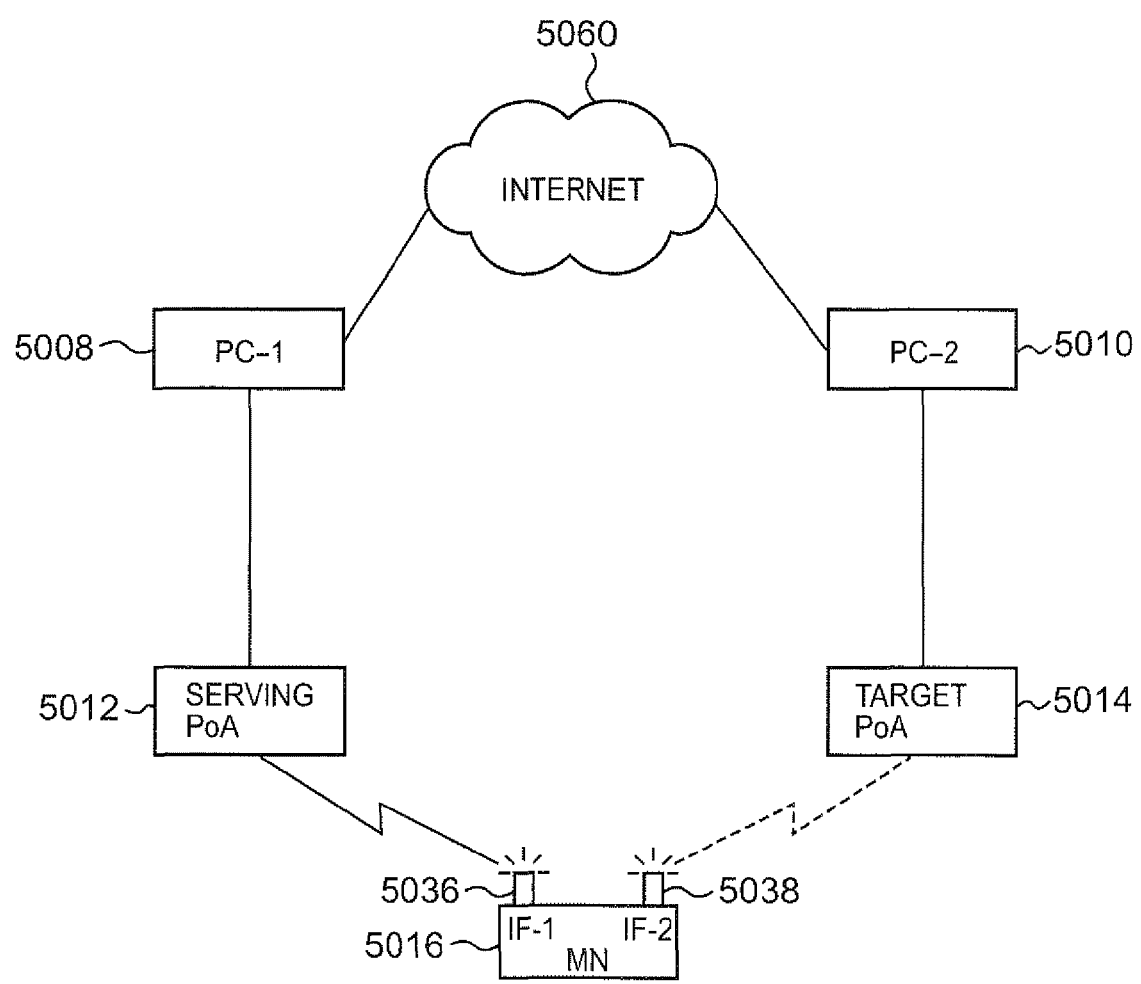

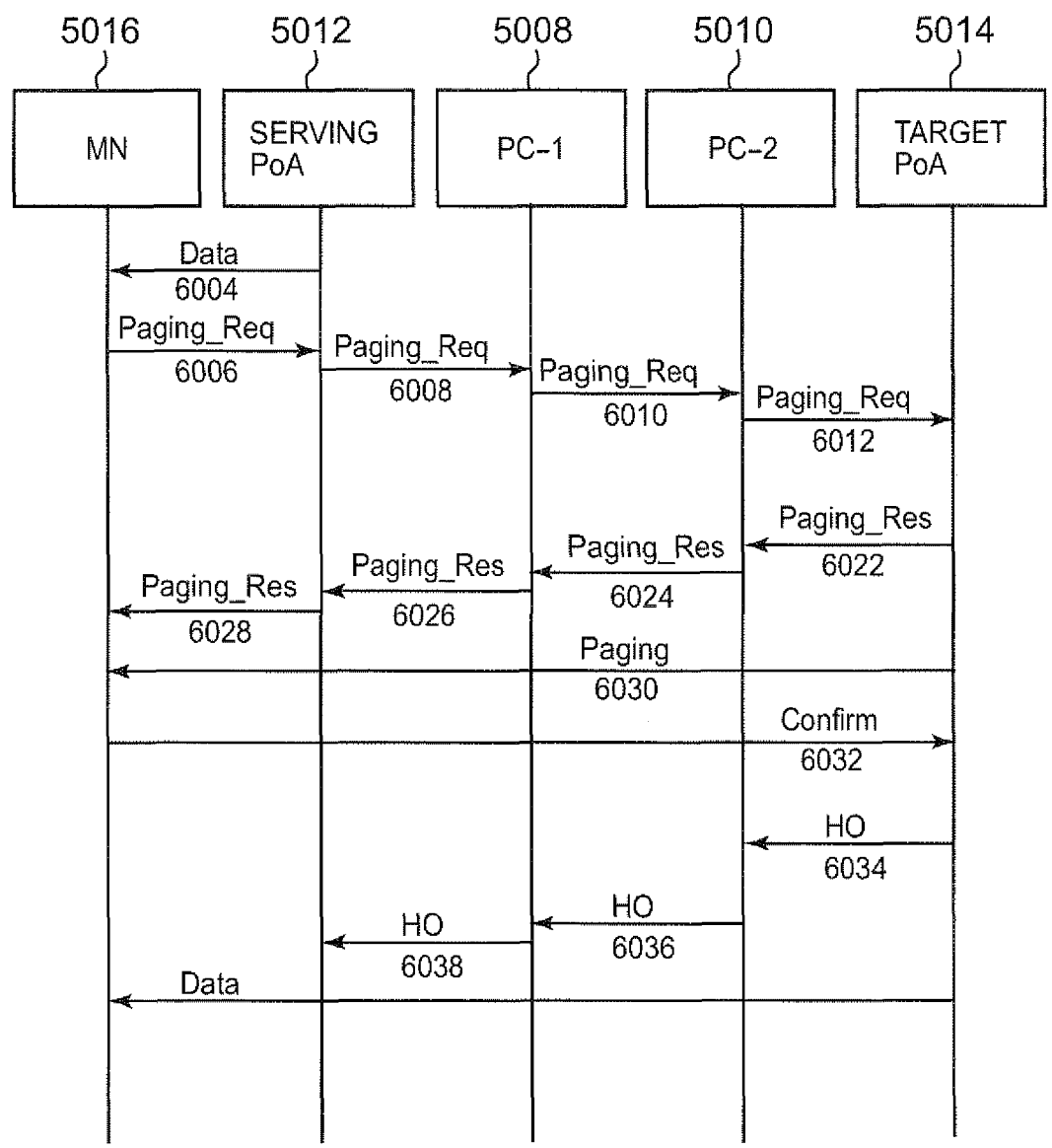

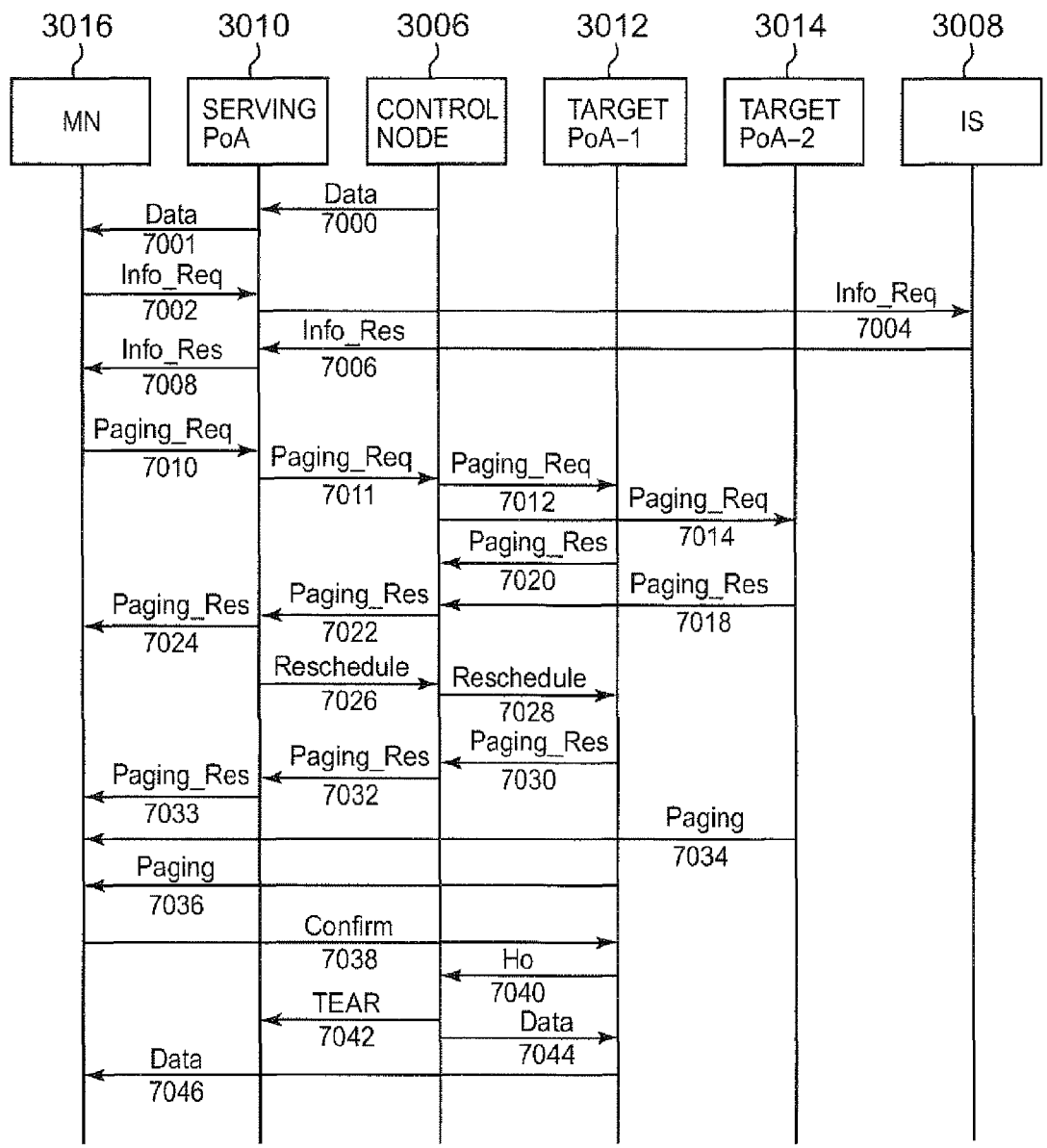

| MN ID | SERVING PoA ID | ODP FRAME # | ODP TIME SLOT # |
|---|---|---|---|
| MN −1 | PoA −1 | FRAME-1 | SLOT-1 |
| MN −2 | PoA −1 | FRAME-1 | SLOT-5 |

11001, 11002, 11003, 11004

MOBILE COMMUNICATION TERMINAL AND COMMUNICATION DEVICE

TECHNICAL FIELD

The present invention relates to a mobile communication terminal and a communication device, and particularly to a mobile communication terminal and a communication device for making a connection through wireless media.

BACKGROUND ART

In a packet-switched data communication network, a mobile node (MN) has plural communication interfaces, and uses these communication interfaces to connect to the same correspondent node (CN).

In this case, the MN can switch the communication interface used for communication from one communication interface to another for the purposes of power savings and use of a network interface with low communication cost, for example.

For connection to a network access point, the MN needs to activate an interface in a dormant state to scan available networks. Then, the MN needs to wait for a sync signal and further for a channel access time slot to request channel/time slot resources.

In this case, the MN first activates the interface to synchronize a clock with the access point, then monitors a beacon of the access point on a steady basis to obtain information on a conflict of transmission time allocated to an MN newly participating in the network, and finally registers with the access point in a transmission slot based on the conflict.

In the meantime, as described in Non-Patent Document 1 cited below, a technique for integrating wireless media to enable handover between heterogeneous networks (for example, between 3GPP and WLAN (Wireless Local Area Network or Wireless LAN)) has been recently developed. In this handover process, the MN basically has plural heterogeneous network interfaces so that it can change the interfaces used for efficient communication depending on a variety of circumstances.

Non-Patent Document 1: IEEE P802.21 Specification Draft 02.00, September 2006.

Non-Patent Document 2: 3GPP TS 36.300v8.3.0 "3rd Generation Partnership Project; Technical Specification Group Radio Access Network and Evolved Universal Terrestrial Radio Access (E-UTRA) and Evolved Universal Terrestrial Radio Access Network (E-UTRAN), Overall description, Stage 2," 2007-12.

Non-Patent Document 3: 3 GPP TSG-RAN WG3#56 Tdoc R3-070780 "Network transport QoS for Home NodeBs (HNB)," 2007-05.

In view of the above issue, when an interface of the MN connects to a network access point, the MN first needs to receive a broadcast message such as a beacon in order to acquire information. The beacon is typically transmitted in predetermined cycles, so that the MN needs to wait for about one cycle (a few cycles in some cases) from when the MN starts to receive the beacon until it acquires necessary information. In other words, the MN needs to keep the originally dormant interface active for a longer period, causing a problem that increases power consumption.

When the MN has plural interfaces and receives data through another interface during this period, the MN needs to leave the interface active until the dormant interface is completely connected to the network access point.

In other words, when interfaces are switched, both interfaces need to remain activated simultaneously, resulting in significant consumption of battery power of the MN. On the other hand, if the active interface is turned off before complete connection to and registration with another network access point through the dormant interface to avoid consumption of battery power, the service to the MN may shut down, and hence the quality of service (QoS) may be interrupted.

DISCLOSURE OF THE INVENTION

In order to solve the above problems, it is an object of the present invention to provide a mobile communication terminal and a communication device capable of reducing delay when the mobile communication terminal starts communication and reducing consumption of a power resource of the mobile communication terminal.

In order to attain the above object, the mobile communication terminal of the present invention comprises:

an interface for connecting to a network through radio communication;

identification information acquiring means for acquiring identification information of a second connection point on the network, to which the mobile communication terminal attempts to connect later; and request message transmitting means for transmitting a request message requesting preparation for connection to the second connection point from the interface connected to a first connection point on the network to the second connection point via the first connection point. According to the above structure, when the mobile communication terminal connects to the second connection point, the connection can be established efficiently, enabling prevention of delay and wasted power consumption.

In addition to the above structure, the mobile communication terminal of the present invention may also comprise identification information storing means for statically holding the identification information of the second connection point, wherein the identification information acquiring means for acquiring the identification information of the second connection point refers to the identification information stored in the identification information storing means to acquire the identification information of the second connection point.

According to the above structure, the mobile communication terminal can refer to information reserved therein to transmit, to the second connection point, the request message requesting preparation for connection to the second connection point.

Further, in addition to the above structure, the mobile communication terminal of the present invention may comprise query means for querying a predetermined information server on the network, wherein the identification information acquiring means for acquiring the identification information of the second connection point causes the query means to acquire the identification information of the second connection point from the predetermined server.

According to the above structure, the mobile communication terminal can query the information server to transmit, to the second connection point, the request message requesting preparation for connection to the second connection point.

Further, in addition to the above structure, the mobile communication terminal of the present invention may comprise:

response message receiving means for receiving a response message as a response to the request message, the response message indicating that the preparation is made; and connection control means for attempting to connect the interface to the second connection point by a predetermined method after confirming the reception of the response message at the response message receiving means.

According to the above structure, the mobile communication terminal can confirm the completion of the preparation for efficient connection to the second connection point.

Further, in addition to the above structure, the mobile communication terminal of the present invention may comprise power supply control means for controlling power supply to the interface to connect to the second connection point according to specific timing information included in the response message.

According to the above structure, the interface can be activated in tune with specific timing to acquire information timely in order to establish an efficient connection.

Further, in addition to the above structure, the mobile communication terminal of the present invention may comprise a plurality of interfaces for connection to the network through radio communication, wherein a connection to the second connection point is attempted through an interface different from the interface being connected to the first connection point.

According to the above structure, establishment of an efficient connection can be made in the mobile communication terminal having plural interfaces.

Further, in addition to the above structure, the mobile communication terminal of the present invention may be such that the request message is a message for notifying the intention of the mobile communication terminal to connect.

According to the above structure, the request message according to the present invention can be embodied in combination with a message used for another purpose.

Further, in addition to the above structure, the mobile communication terminal of the present invention may be such that the message for notifying the intention of the mobile communication terminal to connect is embodied based on the IEEE802.21 specification.

According to this structure, the present invention can be applied to the existing IEEE802.21 specification.

Further, in addition to the above structure, the mobile communication terminal of the present invention may be such that the request message is a message for requesting monitoring of resources available for the mobile communication terminal.

According to this structure, the request message according to the present invention can be embodied in combination with a message used for another purpose.

Further, in addition to the above structure, the mobile communication terminal of the present invention may be such that the message for requesting monitoring of resources available for the mobile communication terminal is embodied based on the IEEE802.21 specification.

According to this structure, the present invention can be applied to the existing IEEE802.21 specification.

Further, in addition to the above structure, the mobile communication terminal of the present invention may comprise:

response message receiving means for receiving a response message including information necessary to establish synchronization with the second connection point and as a response to the request message requesting the information necessary to establish synchronization with the second connection point; and synchronization establishing means for attempting to establish synchronization with the second connection point based on the information necessary to establish the synchronization with the second connection point.

According to the above structure, the mobile communication terminal can establish synchronization with a connection point where transmission of a sync signal is suppressed, for example.

Further, in addition to the above structure, the mobile communication terminal of the present invention may be such that the information necessary to establish the synchronization with the second connection point is information indicative of transmission timing of a sync signal from the second connection point, and the sync signal is transmitted from the second connection point at timing matching the transmission timing of the sync signal from the second connection point.

According to the above structure, the mobile communication terminal can receive the sync signal with reliability based on the transmission timing of the sync signal and hence establish synchronization with a connection point.

In order to attain the above object, the communication device of the present invention is a communication device located on a network, comprising:

request message receiving means for receiving a request message requesting preparation for connection to a second connection point, to which a mobile communication terminal attempts to connect later, via a first connection point being connecting through radio communication to an interface of the mobile communication terminal to enable the mobile communication terminal to connect to the network; and response message transmitting means for instructing the second connection point to prepare for connection of the mobile communication terminal when the request message receiving means receives the request message, and transmitting a response message, as a response to the request message and indicating that the preparation is made, to the mobile communication terminal via the first connection point.

According to the above structure, when the mobile communication terminal connects to the second connection point, the connection can be established efficiently, enabling prevention of delay and wasted power consumption.

In addition to the above structure, the communication device of the present invention may also be such that the second connection point is instructed to narrow a beacon transmission interval when the mobile communication terminal attempts to connect to the second connection point.

According to the above structure, the mobile communication terminal can receive a beacon with a standby time shorter than usual when the mobile communication terminal establishes a connection to the second connection point.

Further, in addition to the above structure, the communication device of the present invention may comprise:

conflict checking means for checking whether pieces of specific timing information, each being set by each of plural candidates for the second connection point, overlap at a simultaneous period, wherein there exist the plural candidates for the second connection point, to which the mobile communication terminal attempts to connect later, and the specific timing information capable of acquiring information necessary for connection of the mobile communication terminal to the second connection point is included in a response message from each of the candidates for the second connection point to the mobile communication terminal; and reconfiguration requesting means for requesting one of the candidates for the second connection point to reconfigure the specific timing information when some pieces of specific timing information set by the candidates for the second connection point overlap at the simultaneous period.

According to the above structure, the mobile communication terminal can be prevented from becoming incapable of receiving information correctly because of a collision possibly occurring when information is transmitted from plural candidates for the second connection point at simultaneous timing.

Further, in addition to the above structure, the communication device of the present invention may be such that the response message is a message including a connection parameter for the mobile communication terminal.

According to this structure, the response message according to the present invention can be embodied in combination with a message for another purpose.

Further, in addition to the above structure, the communication device of the present invention may be such that the message including the connection parameter for the mobile communication terminal is embodied based on the IEEE802.21 specification.

According to this structure, the present invention can be applied to the existing IEEE802.21 specification.

Further, in addition to the above structure, the communication device of the present invention may be such that the response message is a message for notifying that resources necessary for the mobile communication terminal becomes available.

According to this structure, the response message according to the present invention can be embodied in combination with a message for another purpose.

Further, in addition to the above structure, the communication device of the present invention may be such that the message for notifying that resources necessary for the mobile communication terminal becomes available is embodied based on the IEEE802.21 specification.

According to this structure, the present invention can be applied to the existing IEEE802.21 specification.

Further, in addition to the above structure, the communication device of the present invention may be such that the request message is to request information necessary to establish synchronization with the second connection point, and the response message includes the information necessary to establish the synchronization with the second connection point.

According to the above structure, information for enabling the establishment of synchronization with a connection point can be notified to the mobile communication terminal.

Further, in addition to the above structure, the communication device of the present invention may be such that the information necessary to establish the synchronization with the second connection point is information indicative of transmission timing of a sync signal from the second connection point, and the sync signal is transmitted from the second connection point at timing matching the transmission timing of the sync signal from the second connection point.

According to the above structure, the mobile communication terminal can receive the sync signal with reliability based on the information indicative of the transmission timing of the sync signal and hence establish synchronization with a connection point.

In order to attain the above object, the communication device of the present invention is a communication device being connected to a network and functioning as a connection point capable of connecting to an interface of a mobile communication terminal through radio communication to enable the mobile communication terminal to connect to the network, the communication device comprising:

request receiving means for receiving a request of preparation for connection of the communication device, to which the mobile communication terminal attempts to connect later, via another communication point being connected to the interface of the mobile communication terminal to enable the mobile communication terminal to connect to the network;

timing setting means for setting specific timing information providing, to the mobile communication terminal, information necessary for the connection, with respect to the mobile communication terminal related to the request received by the request receiving means; and response means for inserting the specific timing information into a response message to the request received by the request receiving means and returning the response message to the mobile communication terminal.

According to the above structure, when the mobile communication terminal connects to the second connection point, the connection can be established efficiently, enabling prevention of delay and wasted power consumption.

In addition to the above structure, the communication device of the present invention may also comprise beacon transmission control means for narrowing a transmission interval of a beacon including information necessary for the connection and provided to the mobile communication terminal at the specific timing indicated by the specific timing information.

According to the above structure, when establishing a connection to the second connection point, the mobile communication terminal can receive the beacon with a standby time shorter than usual.

Further, in addition to the above structure, the communication device of the present invention may be such that when receiving an instruction, from a predetermined communication device, to change the specific timing information returned to the mobile communication terminal, another timing information indicative of timing different from the specific timing is generated and returned to the mobile communication terminal.

According to the above structure, the mobile communication terminal can be prevented from becoming incapable of receiving information correctly because of a collision possibly occurring when information is transmitted from candidates for the second connection point at simultaneous timing.

In order to attain the above object, the communication device of the present invention is a communication device being connected to a network and functioning as a connection point capable of connecting to an interface of a mobile communication terminal through radio communication to enable the mobile communication terminal to connect to the network, the communication device comprising;

request receiving means for receiving a request of preparation for connection of the communication device, to which the mobile communication terminal attempts to connect later, via another communication point being connecting to the interface of the mobile communication terminal to enable the mobile communication terminal to connect to the network;

response means for inserting, into a response message to the request received by the request receiving means, information necessary for the mobile communication terminal to establish synchronization with the communication device, and returning the information to the mobile communication terminal; and sync signal transmitting means for transmitting a sync signal based on the information necessary to establish the synchronization.

According to the above structure, the communication device can pass the information necessary to establish the synchronization, for example, to enable selective connection control for the mobile communication terminal.

In addition to the above structure, the communication device of the present invention may also be such that the information necessary to establish the synchronization is information indicative of transmission timing of the sync signal from the communication device, and the sync signal transmitting means transmits the sync signal at timing matching the transmission timing of the sync signal.

According to the above structure, the mobile communication terminal can receive the sync signal with reliability based on the information indicative of the transmission timing of the sync signal, enabling prevention of delay and wasted power consumption.

The present invention having the above structures has the advantages of reducing delay when the mobile communication terminal starts communication and reducing consumption of a power resource of the mobile communication terminal.

BRIEF DESCRIPTION OF THE DRAWINGS

FIG. 5 a diagram showing an example of network configuration according to a fourth embodiment of the present invention.

FIG. 6 a sequence chart showing an example of operation according to the fourth embodiment of the present invention.

FIG. 7 a sequence chart showing an example of operation according to a fifth embodiment of the present invention.

FIG. 8 a diagram showing an example of a paging table record held by a serving PoA according to the fifth embodiment of the present invention.

BEST MODE FOR CARRYING OUT THE INVENTION

Embodiments of the present invention will be described below with reference to the drawings. In the following description, although a specific number, time, configuration, protocol name, and other parameters may be described in detail to describe the present invention, such specific conditions used in this specification are just used to describe the present invention and do not limit the present invention.

First Embodiment

Figure 1:
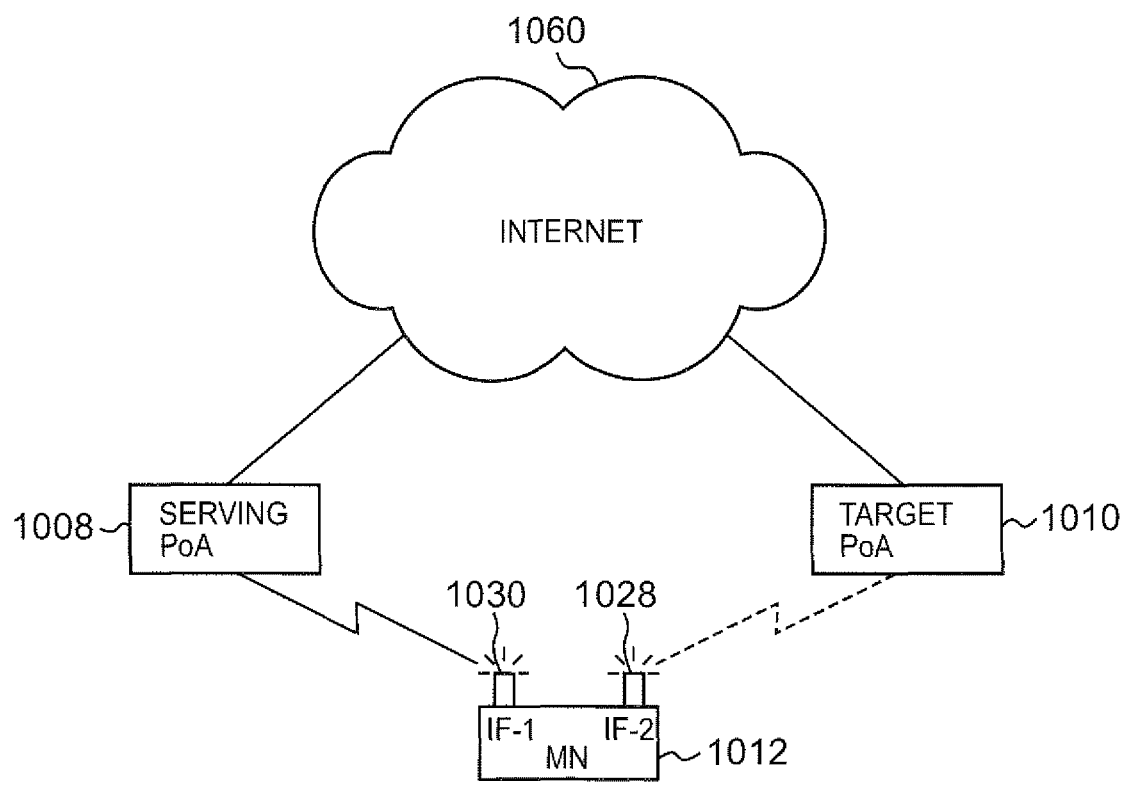
FIG. 1 a diagram showing an example of network configuration according to a first embodiment of the present invention.

A first embodiment of the present invention will be described first. FIG. 1 shows an example of network configuration according to the first embodiment of the present invention. Illustrated in FIG. 1 is a connection relationship among a mobile node (MN) (1012), a serving PoA (Serving Point of Attachment) (1008), a target PoA (Target Point of Attachment) (1010), and the Internet 1060.

In FIG. 1, the MN (1012) has two interfaces (IF-1 (1030) and IF-2 (1028)). As an example, one interface is connectable to a 3GPP network and the other interface is connectable to a WLAN, that is, the interfaces are heterogeneous network interfaces. The MN (1012) is connected to the serving PoA (1008) through the IF-1 (1030). On the other hand, the IF-2 (1028) as another network type interface is in a state where power is off and any signal is not transmitted and received at all.

Suppose that the MN (1012) tries to switch over from the IF-1 (1030) to another network interface (i.e., the IF-2 (1028)) at a certain time to receive data from the IF-2 (1028) through the target PoA (1010).

The serving PoA (1008) represents a connection point to which an interface of the MN (1012) is already connected to allow the MN (1012) to carry out communication. On the other hand, the target PoA represents a connection point to which an interface of the MN (1012) is about to connect (or a connection point that has not been connected yet).

In a deep sleep mode or a disconnected mode, the MN (1012) is usually activated (or wakes up) for at least a predetermined period to receive a broadcast message (e.g., a special beacon) from a PoA (Point of Attachment: connection point). This special beacon includes information (e.g., to acquire synchronization with the PoA or a correct conflict window parameter) necessary for the MN (1012) to start a connection to the PoA and determine an appropriate transmission time slot (or reception time slot).

This predetermined period can usually become a very long period corresponding to several intervals of a normal beacon, for example. Therefore, once the MN (1012) misses this broadcast message (or when the MN (1012) was not able to get all necessary information from only one broadcast message received), the MN (1012) needs to force the interface to remain in the wake-up state for a period (i.e., a beacon interval) until the MN (1012) receives another broadcast message.

During this period, the MN (1012) cannot enter the deep sleep state for power savings. For example, in a WLAN network, a certain information element (e.g., a QoS parameter, etc.) is not always included in every beacon. Therefore, the MN (1012) needs to either query an AP (i.e., the target PoA (1010)) without bringing the interface to the deep sleep state or wait until a special beacon is broadcast next time.

In this condition, the MN (1012) needs to either get an opportunity to transmit a query after waiting for a certain time, or enter a standby state during the beacon interval. This can not only cause a long time delay but also consume the limited power of the MN (1012).

To facilitate processing and reduce the delay time, the MN (1012) transmits a paging request message to the target PoA (1010) via existing connections (e.g., the IF-1 (1030), the serving PoA (1008), and the Internet (1060)) as if another node tries to connect to the IF-2 (1028) of the MN (1012).

To distinguish the above paging request from paging in a normal system, this paging request message includes a special media independent paging object (MIPO).

For example, the MIPO includes an identifier for information indicating that the MN (1012) has started paging (e.g., a flag, an identifier of the MN (1012), or any information on security association with the target PoA (1010)). The MN (1012) can also insert various desired requests into the paging request message to request conditions desired by the MN (1012).

When receiving the paging request message, the target PoA (1010) performs normal processing (e.g., search for a necessary context, resource allocation, schedule adjustment, etc.) to activate the MN (1012) on the IF-2 (1028). Simultaneously, the target PoA (1010) checks the MIPO in the paging request message, and if the MIPO passes the local verification, it performs a special operation.

For example, if the PoA (1010) verifies that the identifier of the MN (1012) is valid and the security association is justified, the target PoA (1010) broadcasts information necessary to establish the connection of the MN (1012) earlier (shorter) than a normal scheduled period (normally estimated period) T. The information necessary to establish the connection of the MN (1012) includes, for example, a related QoS parameter set, related timing information, etc.

As an example of operation that the target PoA (1010) can perform, the MN (1012) is set in a polling list, and a transmission opportunity is assigned to the MN (1012) without waiting for a request from the IF-2 (1028) during the next scheduled period.

If the MN (1012) needs only special information, the target PoA (1010) (e.g., AP) embeds this special information into a beacon and transmits it every beacon interval. As a result, the MN (1012) can acquire necessary information more quickly than usual because the interval of the beacon from the target PoA (1010) is narrower than usual when the MN (1012) activates the interface (IF-2 (1030)).

The target PoA (1010) can also transmit a paging response message to the MN (1012) via other connections (e.g., the Internet 1060, the serving PoA (1008) and the IF-1 (1030)). Thus, related information (e.g., period T during which AP transmits a broadcast message) is provided to the MN (1012). The target PoA (1010) may also include information independent of actual timing of access technology (1024). In other words, for example, some key information, window size, connection identification value, or other various pieces of information may be transmitted directly to the MN (1012) via the serving PoA (1008) and the IF-1 (1030).

As another operation, a trigger information element (TIE) of the MIPO may be included in the paging request message. If receiving this TIE, the target PoA (1010) sets a monitoring schedule, rather than immediate generation of the paging response message. Then, as a result of monitoring, when grasping that information related to the TIE exceeds a threshold, the target PoA (1010) creates an start-up (wake-up) event and inserts this wake-up event into a paging response to be transmitted to another interface (i.e., to the MN (1012) via the IF-1 (1030) and the serving PoA (1008)).

As an example of exceeding such a threshold, there is a case where a packet (queued packet) exceeds a predetermined limit. The occurrence of such an event that exceeds this threshold makes the MN (1012) wake up on the IF-2 (1028) side based on the wake-up event received on the IF-1 (1030). As a result, the queued packet can be received more quickly than a case where the MN (1012) simply enters the wake-up state during the predetermined period.

Second Embodiment

Figure 2:
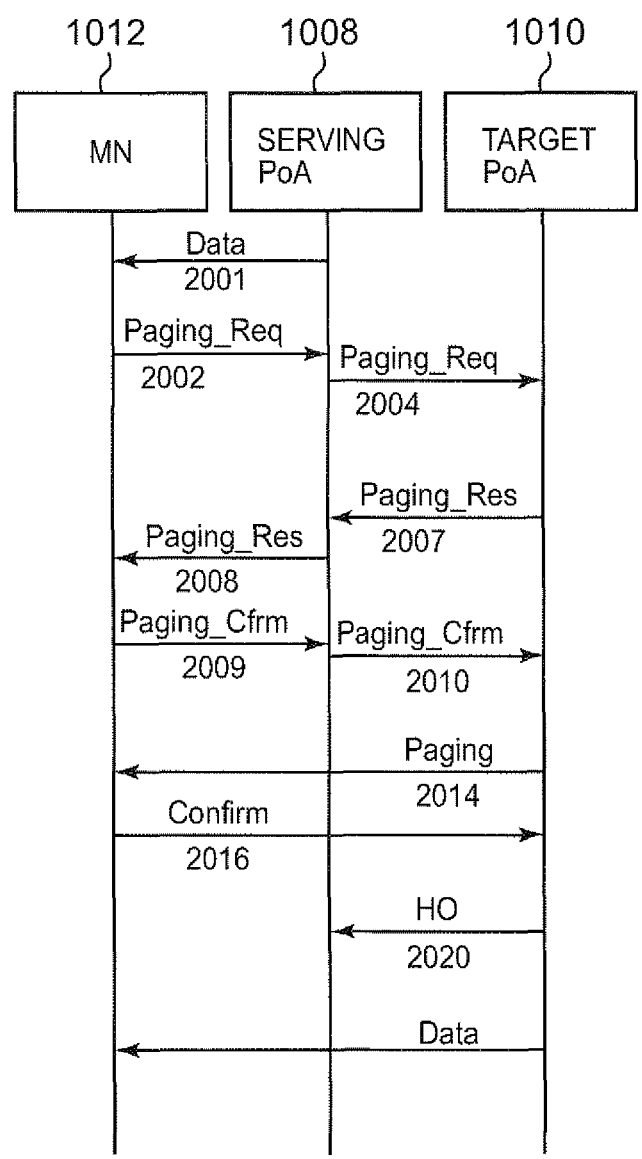
FIG. 2 a sequence chart showing an example of operation according to a second embodiment of the present invention.

A second embodiment of the present invention will be described next. FIG. 2 illustrates a sequence chart showing an example of operation according to the second embodiment of the present invention. As the initial state of the sequence chart shown in FIG. 2, it is assumed that the IF-1 (1030) of the MN (1012) is connected to the serving PoA (1008) as shown in FIG. 1 to receive data (2001: Data) via the serving PoA (1008).

In this condition, the MN (1012) transmits a paging request message (200: Paging_Req) to the serving PoA (1008) to request the target PoA (1010) to transmit a (on-demand) paging signal that responds to the request. The serving PoA (1008) transfers the paging request message (2004: Paging_Req) to the target PoA (1010).

The paging request message has the following fields:
    Common header including information such as source and destination addresses and a message identifier
    Session ID
    Paging request ID
    Necessary resource
    ID of target PoA (for example, reserved as the history of the MN, or information is preset)
    Type of dormant interface (here, IF-2 (1028))
    Subscriber information of target PoA The target PoA (1010) checks whether a resource required by the MN (1012) and described in a resource request field of the paging request message is allocated for the MN (1012). If the required resource is allocated for the MN (1012), then the target PoA (1010) transmits a paging response message (2007: Paging_Cfrm) to the serving PoA (1008).

The paging response message has the following fields:
    Common header including information such as source and destination addresses and a message identifier
    Session ID
    Paging request ID
    Relative scheduled paging time
    Available resource
    ID of target PoA
    Channel number
    Reception time upon receiving a confirmation message (option)

The relative scheduled paging time is a relative time upon making the MN (1012) active for a certain period and for which the target PoA (1010) can guarantee the acquisition of information required by the MN (1012).

Since the MN (1012) is synchronized with the serving PoA (1008) at this time, though being in step with the clock of the serving PoA (1008), this scheduled start-up time (wake-up time) is based on the clock of the target PoA (1010).

The serving PoA (1008) that has received the paging response message (2007: Paging_Res) forwards the paging response message (2008: Paging_Res) to the MN (1012). At this time, the MN (1012) may return a paging confirmation message (2009, 2010: Paging_Cfrm) to the target PoA (1010) to notify whether the MN (1012) is ready to receive data from the target PoA (1010).

The paging confirmation message has the following fields:
Common header including information such as source and destination addresses and a message identifier
Paging request ID
ID of target PoA Next, the MN (1012) adjusts the schedule to activate the IF-2 (1028) at a wake-up time (relative scheduled paging time field) described in the paging response message (2008). Further, the target PoA (1010) transmits a short, on-demand paging message (2014: Paging) to the MN (1012) at the relative scheduled paging time.

The on-demand paging message has the following fields:
Common header including information such as source and destination addresses and a message identifier
Paging request ID
ID of target PoA
Scheduled data transmission time
Scheduled confirmation message transmission time
Time scheduled to transmit a confirmation message for confirming that a radio resource is available The paging message (2014: Paging) is a control signal in a medium access control (MAC) layer to be transmitted to the interface (IF-2) via the target PoA (1010). The paging message (2014: Paging) is generally transmitted to notice the MN (1012) that a call waiting for a connection to be established exists.

Information on the radio resource (e.g., channel number, time slot, data rate, etc.) allocable to the MN (1012) when the MN (1012) transmits or receives data may be included in the paging message (2014: Paging). The information on the radio resource may be included in the paging response message (2008: Paging_Res). Further, the IF-2 (1028) of the MN (1012) may be completely in the off-state before receiving the paging message (2014: Paging), or the paging message (2014) may be used to test whether delivery from the target PoA (1010) to the MN (1012) via the interface IF-2 (1028) is possible.

When the paging message (2014: Paging) is received at the MN (1012) without error, the MN (1012) returns a confirmation message (2016: Confirm) to the target PoA (1010).

The confirmation message has the following fields:
Common header including information such as source and destination addresses and a message identifier
Paging request ID
ID of target PoA After receiving the confirmation message (2016: Confirm) from the MN (1012), the target PoA (1010) transmits a handover complete message (2020: HO (Handover Complete)) is transmitted to the serving PoA (1008).

The HO message has the following fields:
Common header including information on source and destination addresses or a message identifier (type of message, reservation, RESERVE, TEAR, etc.)
Reservation identification information The target PoA (1010) starts transmission of data (2022: Data) addressed to the MN (1012) at the scheduled data transmission time (described in the paging message). Further, the MN (1012) makes an interface (here, IF-2 (1028)) active, the interface being dormant at the scheduled data transmission time described in the paging message (2014).

Third Embodiment

Figure 3:
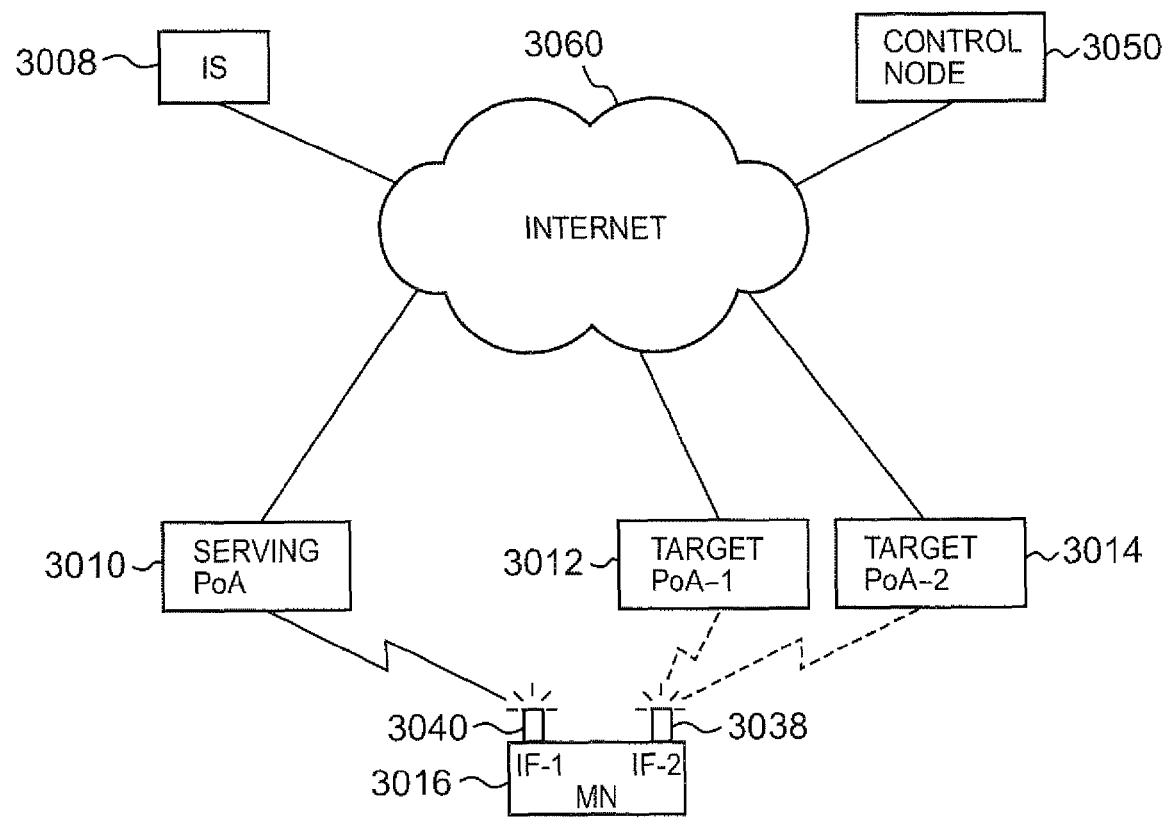
FIG. 3 a diagram showing an example of network configuration according to a third embodiment of the present invention.
Figure 4:
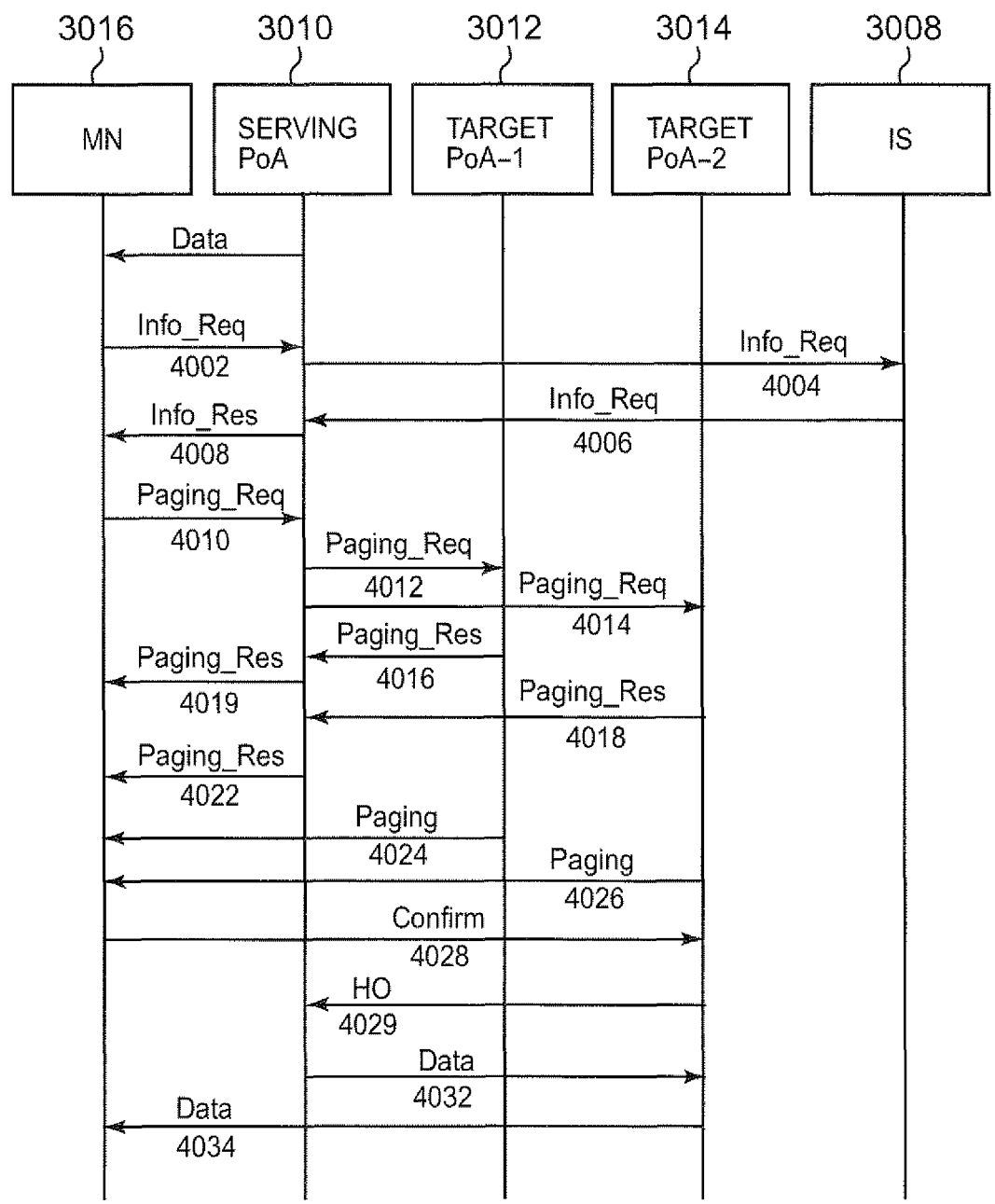
FIG. 4 a sequence chart showing an example of operation according to the third embodiment of the present invention.

A third embodiment of the present invention will be described next. FIG. 3 shows an example of network configuration according to the third embodiment of the present invention. FIG. 4 illustrates a sequence chart showing an example of operation according to the third embodiment of the present invention. Note that FIG. 4 shows operations based on the network configuration shown in FIG. 3. As the initial state of the sequence chart shown in FIG. 4, it is assumed that an IF-1 (3040) of an MN (3016) is connected to a serving PoA (3010) as shown in FIG. 3 to receive data (4001: Data) via the serving PoA (3010).

In FIG. 3, when the MN (3016) switches over from the active interface (IF-1 (3040)) to a dormant interface (IF-2 (3038)), the MN (3016) may not have information on target PoAs (3012, 3014) for the dormant IF-2 (3038), or information on the target PoAs may not exist at the serving PoA (3010).

However, as shown in FIG. 3, since the serving PoA (3010) gets information on connection points that can be target PoAs, it may be able to access an information server (IS) (3008).

Upon switching over from the IF-1 (3040) to the other network interface (IF-2 (3038)), the MN (3016) needs to first receive a paging message from a target PoA. To request the target PoA to transmit an on-demand paging message for the MN (3016), the MN (3016) first transmits, to the serving PoA (3010), an information request message including current location information (e.g., GPS position information) and information on the type of network interface of the IF-2 (3038).

The information request message has the following fields:
Common header including information such as source and destination addresses and a message identifier
Paging request ID
Type of dormant interface
Subscriber information of MN
Location information of MN The serving PoA (3010) transfers an information request message (4004: Info_Req) to the information server (3008). The information server (3008) checks its own database. In this database, information on correspondence between a geographical area having a certain range and a network PoA is stored. The database of the information server (3008) is linked to a GPS server to search for a network PoA covering an area (including the current location of the MN (3016)) in which the MN (3016) is located, for example.

The information server (3008) consults the database to return, to the serving PoA (3010), information about one or more network PoAs corresponding to the current position of the MN (3016) through an information response message (4006: Info_Res).

The information response message has the following fields:
Common header including information such as source and destination addresses and a message identifier
Paging request ID
ID of target PoA-1
ID of target PoA-2
ID of target PoA-N
(The Number of Target PoAs May be One or More)

The serving PoA (3010) transmits an information response message (4008: Info_Res) to the MN (3016). When receiving the information response message (4008: Info_Res), the MN (3016) selects target PoAs. This selection is made based on, for example, the subscriber information, costs, etc.

After selecting the target PoAs, the MN (3016) transmits, to the serving PoA (3010), paging request messages to the selected target PoAs (e.g., two target PoAs 3012, 3014) in the form of an aggregated paging request message (4010: Paging_Req).

The aggregated paging request message has the following fields:
Common header including information such as source and destination addresses and message identifiers
Session ID
Paging request ID
Necessary QSPEC
Available QSPEC
ID of target PoA-1
ID of target PoA-2
ID of target PoA-N
Type of dormant interface
Subscriber information of target PoAs
(The Number of Target PoAs May be One or More)

When receiving the aggregated paging request message (4010: Paging_Req) from the MN (3016), the serving PoA (3010) transmits each paging request message (4012, 4014: Paging_Req) to each target PoA (3012, 3014) described in the aggregated paging request message (4010: Paging_Req).

When receiving the paging request message (4012, 4014: Paging_Req), the target PoA (3012, 3014) returns a paging response message (4016, 4018) to the serving PoA (3010). The serving PoA (3010) transmits two paging response messages (4019, 4022) to the MN (3016).

When receiving the paging response messages (4019, 4022) from the serving PoA (3010), the MN (3016) switches over to the IF-2 (3038) at the relative scheduled paging time described in each paging response message (4019, 4022).

The MN (3016) makes the dormant IF-2 (3028) active at the relative scheduled paging time described in the paging response message (4019, 4022) to enter a standby state for receiving a paging message from each target PoA (3012, 3014).

When receiving the paging messages (4024, 4026) from the target PoAs (3012, 3014), the MN (3018) selects an optimal target PoA (here, the target PoA 3014 is assumed) based on the signal quality of the paging messages (4024, 4026).

The paging message (4024, 4026) includes time for the MN (3016) to transmit a confirmation message (scheduled confirmation message transmission time) and data transmission time scheduled for the MN (3016) to start receiving data (scheduled data transmission time).

The MN (3016) transmits a confirmation message (4028: Confirm) to the selected target PoA (3014) at the scheduled transmission time (scheduled confirmation message transmission time described in the paging message). Further, a handover complete message (4029: HO) indicative of the completion of handover to disconnect the connection between the serving PoA (3010) and the MN (3016), and data (4034: Data) is transferred from the serving PoA (3010) to the selected target PoA (3014). Then, the MN (3016) starts receiving the data (4034: Data) transmitted from the selected target PoA (3014) at the scheduled start-up time (wake-up time).

Fourth Embodiment

A fourth embodiment of the present invention will be described next. FIG. 5 shows operations based on the network configuration according to the fourth embodiment of the present invention. FIG. 6 illustrates a sequence chart showing an example of operation according to the fourth embodiment of the present invention. Note that FIG. 6 shows operations based on the network configuration shown in FIG. 5. As the initial state of the sequence chart shown in FIG. 6, it is assumed that an IF-1 (5036) of an MN (5016) is connected to a serving PoA (5012) as shown in FIG. 5 to receive data (6004: Data) via the serving PoA (5012).

As shown in FIG. 5, a paging controller(s) (PC) (PC-1 (5008) and PC-2 (5010) in FIG. 5) may exist on a network in which the MN (5016) is trying to switch over from an active interface to a dormant interface. This paging controller (5008, 5010) enables the MN (5016) to communicate with a target PoA from which an on-demand paging message is transmitted to the MN (5016).

As mentioned above, when the MN (5016) switches over from the IF-1 (5036) to another network interface (e.g., IF-2 (5038)) (initially in the power-off state), the MN (5016) needs to receive a paging message from a target PoA (5014), In order to receive the paging message from the target PoA (5014) without performing normal processing in which the IF-2 (5038) is made active to wait for the paging message, the MN (5016) transmits an on-demand paging request message (6006: Paging_Req) to the serving PoA (5012) as shown in FIG. 6. The serving PoA (5012) transfers the paging request message (6008: Paging_Req) to the paging controller (PC-1) (5008). The PC-1 (5008) transfers the paging request message (6010: Paging_Req) to the PC-2 (5010). This paging request message (6012) is transferred, and the paging request message (6012: Paging_Req) reaches the target PoA (5014).

When receiving the paging request message (6012: Paging_Req), the target PoA (5014) transmits a paging response message (6022, 6024, 6026, 6028: Paging_Res) to the MN (5016) via the PC-2 (5010), the PC-1 (5008), and the target PoA (5012).

When receiving the paging response message (6028: Paging_Res), the MN (5016) activates the IF-2 (5038) at a start-up time (wake-up time) described in this paging response message (6028: Paging_Res) to receive a paging message (6030: Paging) from the target PoA (5014).

When receiving the paging message (6030: Paging) without error, the MN (5016) transmits a confirmation message (6032: Confirm) to the target PoA (5014) via the same network interface IF-2 (5038) as the interface that received the paging message (6030: Paging) transmitted from the target PoA (5014).

When receiving the confirmation message (6032), the target PoA (5014) transmits, to the PC-2 (5010), a handover complete message (6034: HO) notifying completion of handover. The PC-2 (5010) transfers the handover complete message (6036: HO) to the PC-1 (5008), and the PC-1 (5008) transfers the handover complete message (6038: HO) to the serving PoA (5012).

Fifth Embodiment

A fifth embodiment of the present invention will be described next. FIG. 7 illustrates a sequence chart showing an example of operation according to the fifth embodiment of the present invention. Note that FIG. 7 shows operations based on the network configuration shown in FIG. 3. As the initial state of the sequence chart shown in FIG. 7, it is assumed that the IF-1 (3040) of the MN (3016) is connected to the serving PoA (3010) as shown in FIG. 3 to receive data (7001: Data) via the serving PoA (3010).

In the operations shown in the sequence chart of FIG. 7, since some are the same as those in the sequence chart shown in FIG. 4 described above, only necessary operations will be described here. A control node 3006 is a node corresponding to a branch point/merge point of a data path to the MN (3016). For example, the control node (3016) functions as a branch point at which an aggregated paging request message (7011) transmitted from the serving PoA (3010) is split into a paging request message (7012) to the target PoA-1 (3012) and a paging request message (7014) to the target PoA-2 (3014), or a merge point at which a paging response message (7020) from the target PoA-1 (3012) and a paging request message (7018) from the target PoA-2 are merged into one aggregated paging response message (7022) and transmitted to the serving PoA (3010). This control node (3006) is useful for efficient management of data paths, but not essential to the present invention. In other words, for example, the serving PoA (3010) may transmit and receive messages to and from each target PoA individually without providing the control node (3006) to merge/branch the messages from and to the target PoA-1 (3012) and the target PoA-2 (3014).

The fifth embodiment will be described with respect to a case where two target PoA-1 (3012) and target PoA-2 (3014) have been scheduled to transmit paging messages to the MN (3016) simultaneously or at very close timings in the network configuration shown in FIG. 3.

If such a schedule causes two paging messages to conflict, the MN (3016) may not be able to receive these two paging messages correctly.

For example, it is assumed that, as shown in FIG. 7, the target PoA-1 (3012) and the target PoA-2 (3014) set the same relative scheduled paging time to transmit the paging response messages (7018, 7020) to the MN (3016).

At this time, the paging response message (7020) from the target PoA-1 (3012) is received at the control node (7020) in FIG. 7, and then the paging response message (7018) from the target PoA-2 (3014) is received at the control node (3006). After that, the aggregated paging response message (7022) into which these paging response messages (7020 7018) are merged is transmitted from the control node (3006) to the serving PoA (3010).

Allowing for the configuration without the control node (3006), it may be considered that the paging response message (7020) from the target PoA-1 (3012) is first received at the serving PoA (3010) and the paging response message (7018) from the target PoA-2 (3014) is then received at the serving PoA (3010).

Figure 9:
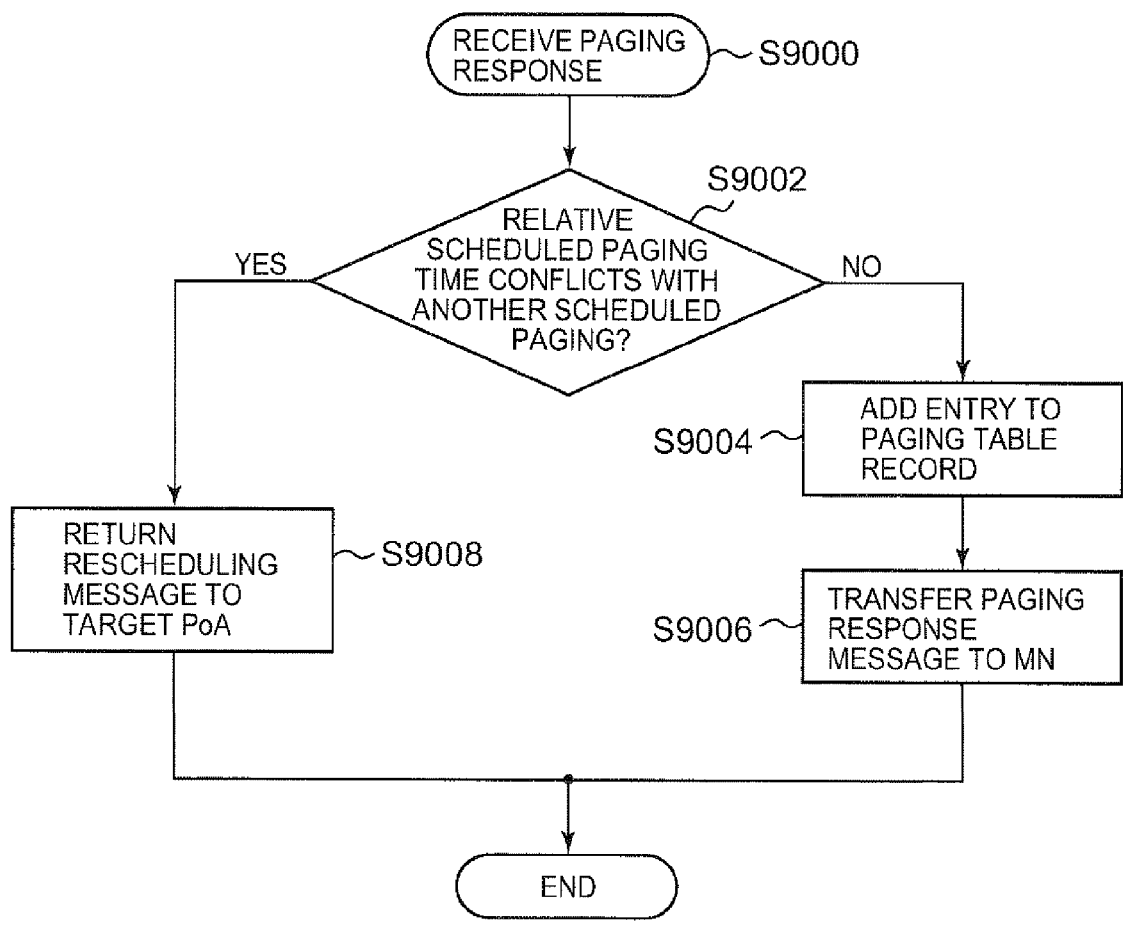
FIG. 9 a flowchart showing an example of processing performed by the serving PoA according to the fifth embodiment of the present invention.

An example of processing performed by the serving PoA in this case will be described below with reference to FIG. 9. FIG. 9 illustrates a flowchart showing an example of processing performed by the serving PoA according to the fifth embodiment of the present invention.

When receiving a paging response message (step S9000), the serving PoA (3010) checks whether the relative scheduled paging time in each entry (entry for the schedule already set out) of the paging table record (see FIG. 8) reserved therein does not conflict with a relative scheduled paging time included in the received paging response message (whether they overlap at the same time or at a very close time) (step S9002).

If both relative scheduled paging times conflict, a rescheduling message instructing a change (rescheduling) in the relative scheduled paging time is transmitted to the source of the paging response message received (step S9004). On the other hand, if both relative scheduled paging times do not conflict, an entry is added to the paging entry table as shown in FIG. 8 to list the content of the received paging response message in the entry (step S9004). Further, the serving PoA (3010) transfers this received paging response message to the MN (3016) (step S9006).

In FIG. 7, the serving PoA (3010) transfers, to the MN (3016), a paging response message processed first among the plural paging response messages in the aggregated paging request message (7022) (or a paging response message received first and processed in the configuration without the control node (3006)). As a result, the paging response message (7024: Paging_Res) is transferred to the MN (3016) as shown in FIG. 7. On the other hand, as for the paging response message (7018: Paging_Res) whose relative scheduled paging time overlaps with another at the same time or at a very close time, the rescheduling message (7026: Reschedule) is returned as shown in FIG. 7.

The target PoA-1 (3012) that has received the returned rescheduling message (7028: Reschedule) generates and returns another paging response message (7030: Paging_Res), in which time different from the relative scheduled paging time included in the previously-transmitted paging response message is generated and newly set. This newly transmitted paging response message is also checked for an overlap between relative scheduled paging times in the same manner using the algorism shown in FIG. 9. If no time conflict is checked, the paging response message (7033: Paging_Res) is transmitted to the MN (3016).

The rescheduling message has the following fields:
Common header including information such as source and destination addresses and a message identifier
Paging request ID
ID of target PoA Sixth Embodiment A sixth embodiment of the present invention will be described next.

Figure 10:
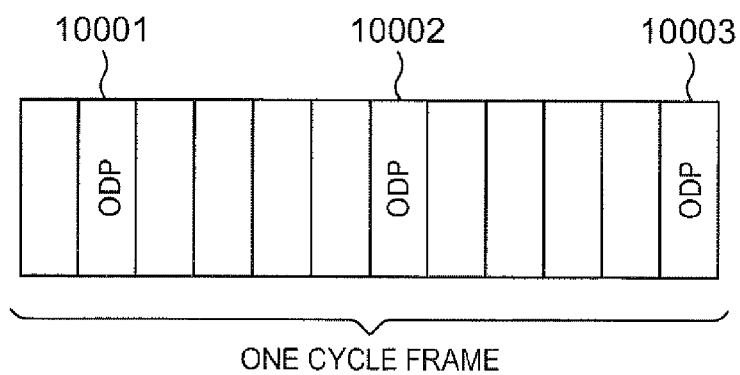
FIG. 10 a diagram showing an example of arrangement of time slots for on-demand paging (ODP) in a time frame of the serving PoA according to the fifth embodiment of the present invention.

In the aforementioned first to third embodiments, the target PoA transmits the on-demand paging message requested from the mobile node. In this case, as shown in FIG. 10, the target PoA has time slots (10001, 10002, 10003) or radio channels for short on-demand paging (ODP) for transmitting the on-demand paging message requested from the mobile node within a time frame of the target PoA.

Figures 11, 12:
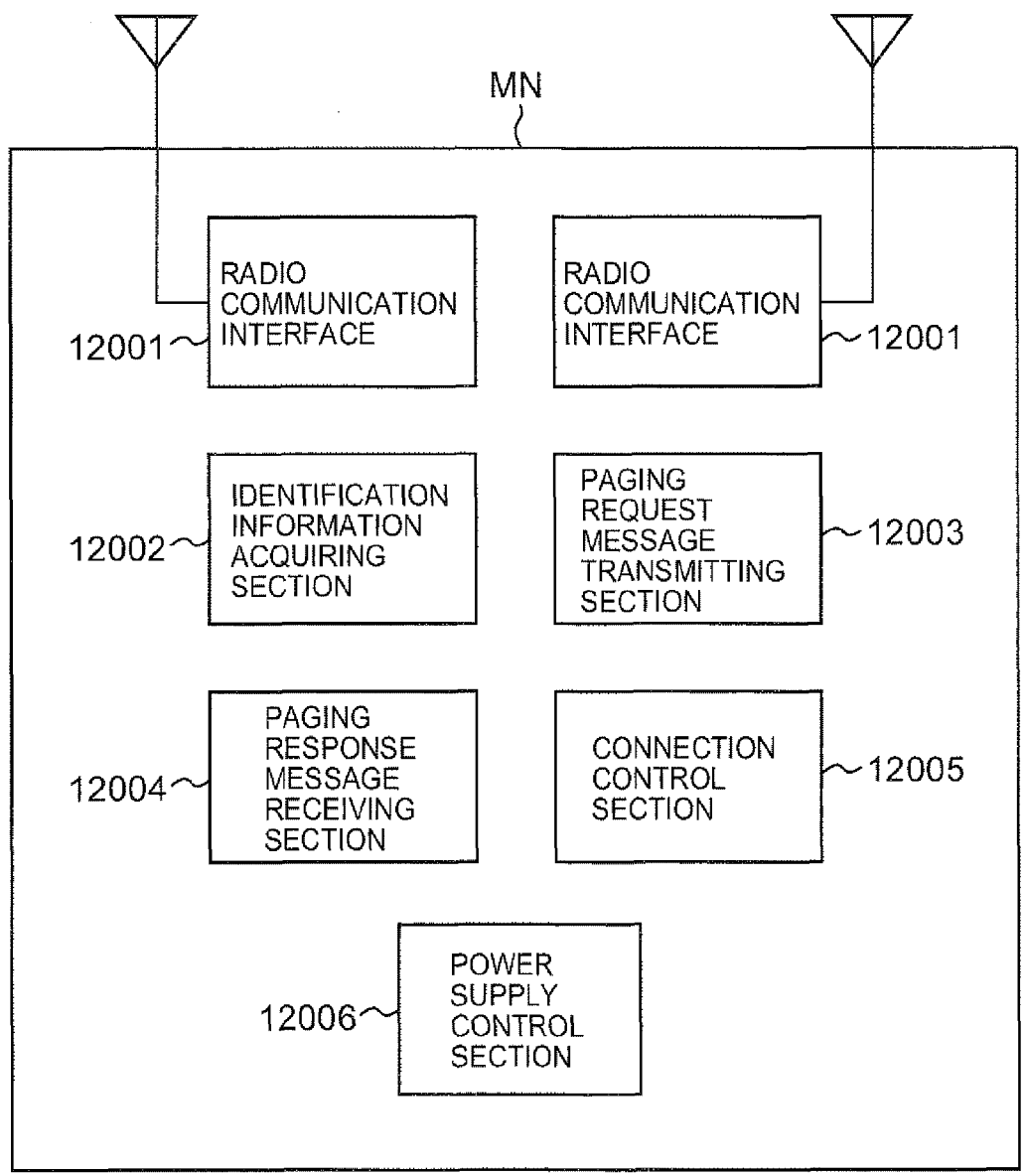
FIG. 11 a diagram showing an example of a paging request table held by the serving PoA according to a sixth embodiment of the present invention.
FIG. 12 a diagram showing an example of the structure of an MN for implementing the present invention.

In this case, as shown in FIG. 11, the target PoA holds a table including a list of on-demand paging request messages the target PoA has received. When receiving an on-demand paging request message, the target PoA adds an entry to an on-demand paging request table as shown in FIG. 11, and inserts the content of the received on-demand paging request message. Further, the target PoA checks a so free time slot available for transmission of the next on-demand paging message and sets a transmission frame number and a transmission time slot for the on-demand paging message to be transmitted in response to the paging request.

FIG. 12 is a diagram showing an example of the structure of the MN for implementing the present invention. In FIG. 12, a structure of the MN capable of implementing all the aforementioned embodiments is schematically shown, but only necessary features can be selectively employed or implemented as appropriate to realize the features of each of the aforementioned embodiments.

The MN shown in FIG. 12 has one or plural radio communication interfaces 12001 (in FIG. 12, two radio communication interfaces 12001 are shown), an identification information acquiring section 12002, a paging request message transmitting section 12003, a paging response message receiving section 12004, a connection control section 12005, and a power supply control section 12006.

The radio communication interface 12001 is an interface for connection to a PoA (serving PoA or target PoA) through radio communication.

The identification information acquiring section 12002 has the function of acquiring identification information of a target PoA. The identification information of the target PoA can be acquired as a past history of movement or some configuration information, or by querying the information server.

The paging request message transmitting section 12003 has the function of generating and transmitting a paging request message to be transmitted to the target PoA via a serving PoA connected.

The paging response message receiving section 12004 has the function of receiving and processing a paging response message as a response to the paging request message and including various information, such as an indication that the target PoA is ready for connection and the relative scheduled paging time.

The connection control section 12005 has the function of performing processing for establishing a connection to the target PoA according to the paging response message based on the information elements included in this message.

The power supply control section 12006 has the function of managing the mode of each radio communication interface 12001 (active mode, dormant mode, sleep mode, etc.) to reduce wasted power consumption during a non-operating time.

Figure 13:
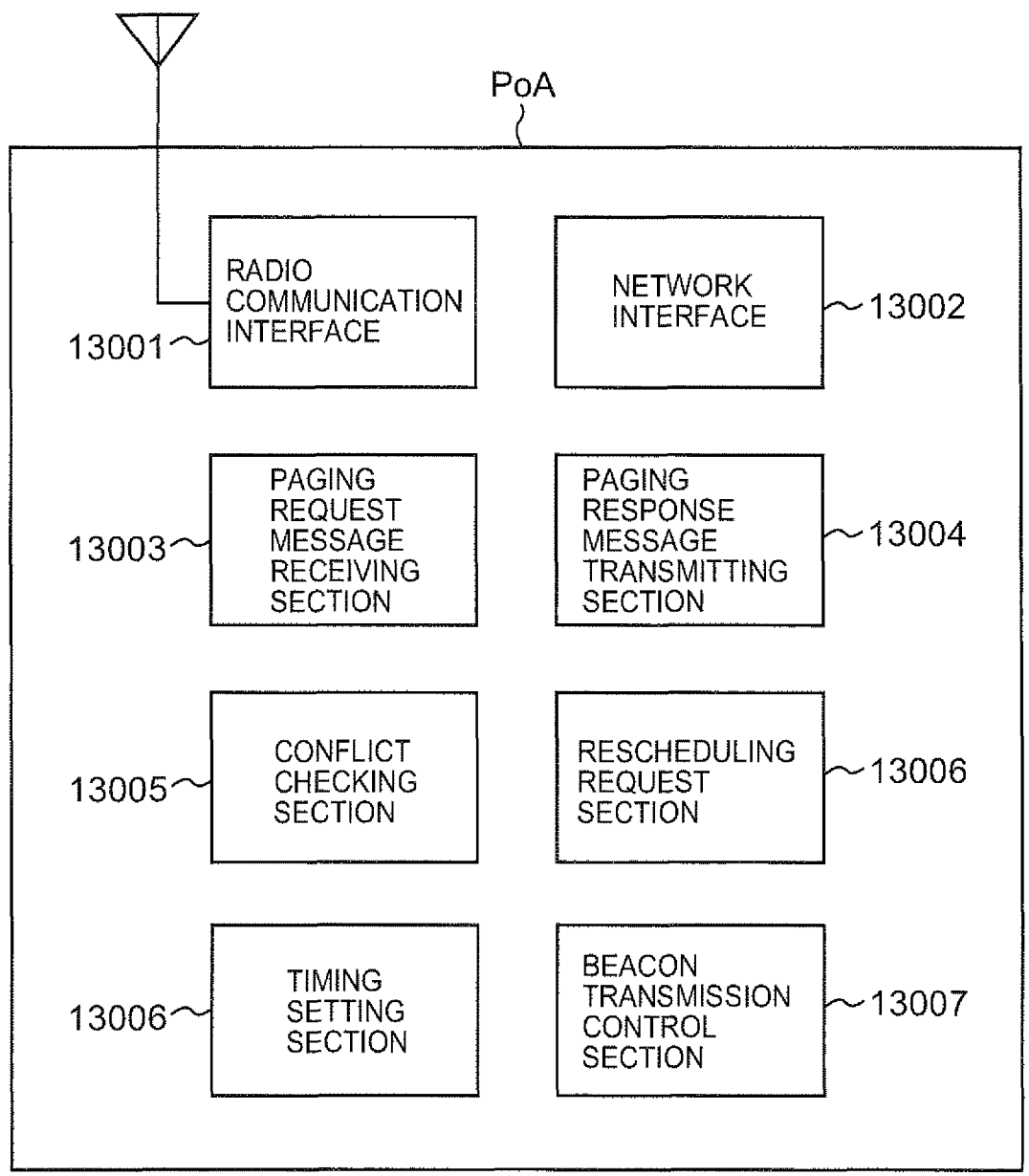
FIG. 13 a diagram showing an example of the structure of a PoA for implementing the present invention.

FIG. 13 is a diagram showing an example of the structure of a PoA (serving PoA or target PoA) for implementing the present invention. In FIG. 12, a structure of the MN capable of implementing all the aforementioned embodiments is schematically shown, but only necessary features can be selectively employed or implemented as appropriate to realize the features of each of the aforementioned embodiments.

The PoA shown in FIG. 13 has a radio communication interface 13001, a network interface 13002, a paging request message receiving section 13003, a paging response message transmitting section 13004, a conflict checking section 13005, a rescheduling request section 13006, a timing setting section 13007, and a beacon transmission control section 13008.

The radio communication interface 13001 is an interface for connection to the MN through radio communication. The network interface 13002 is an interface for connection to a core network, the Internet, or the like. Thus, the MN connects to the PoA through the radio communication interface 13001 and the network interface 13002 to enable connection to the Internet or the like.

The paging request message receiving section 13003 has the function of receiving and processing a paging request message transmitted from the MN (or any other communication device relaying the request from the MN).

The paging response message transmitting section 13004 has the function of generating and transmitting a paging response message as a response to the paging request message and including various information, such as an indication that the target PoA is ready for connection and the relative scheduled paging time.

The conflict checking section 13005 has the function of checking whether a relative scheduled paging time set for the same MN by each of plural candidates for the target PoA overlaps with another at the same timing or at very close timing. The conflict checking section 13005 also manages the paging table record shown in FIG. 8.

The rescheduling request section 13006 has the function of transmitting a rescheduling message requesting either one of target PoAs to change the relative scheduled paging time when the relative scheduled paging times thereof are checked to overlap each other.

The timing setting section 13007 has the function of setting a relative scheduled paging time indicative of the optimum start-up time when receiving a request through the paging request message for support to help establish the connection of the MN to reduce power consumption of the MN. This relative scheduled paging time is inserted, for example, into the paging request message and notified to the MN.

The beacon transmission control section 13008 has the function of adjusting the beacon transmission interval (transmission cycle). In the present invention, when the MN connects to the target PoA, the beacon transmission interval is basically set narrower than the normal one to shorten the standby time for beacon reception. Thus, if the beacon transmission interval is narrowed down in response to the relative scheduled paging time, for example, the MN can receive the beacon quickly (with a shorter standby time) at the time of being notified.

The following seventh to fourteenth embodiments of the present invention describe that the present invention can be applied to the IEEE802.21 framework and implemented in this framework.

Seventh Embodiment

Figure 14:
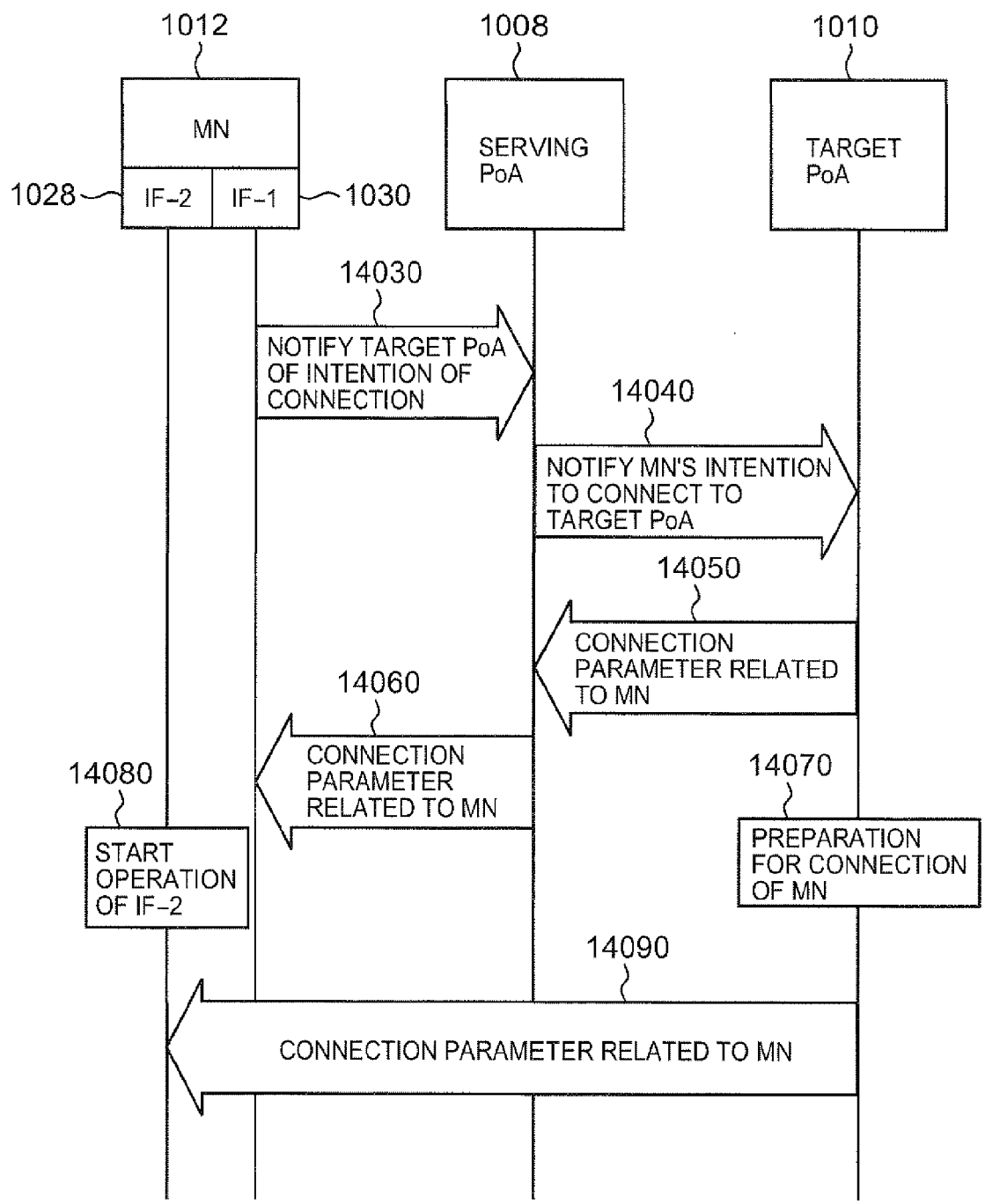
FIG. 14 a sequence chart showing an overview of operation according to a seventh embodiment of the present invention.

A seventh embodiment of the present invention will be described below. FIG. 14 illustrates a sequence chart showing an overview of operation according to the seventh embodiment of the present invention.

At first, the MN (1012) notifies the target PoA (1010) of the intention of connection (that the MN desires to connect). This message (14030) is transmitted to the serving PoA (1008) through the active interface IF-1 (1030). The serving PoA (1008) transmits, to the target PoA (1010), the message (14040) notifying the intention of the MN (1012) to connect.

In response to this message (14040), the target PoA (1010) may return a message including parameters useful for the MN (1012) to establish the connection. The message (14050, 14060) including the connection parameter for the MN (1012) is transmitted to the MN (1012) via the serving PoA (1008).

The target PoA (1010) may start preparing for the establishment of the connection (the connection the MN (1012) desires), which is about to be established with the MN (1012) (14070). In this case, when receiving the connection parameter from the serving PoA (1008), the MN (1012) may activate the IF-2 (1028) (14080) to receive the connection parameter (14090) directly sent from the target PoA (1010).

Some expansion to change an IEEE802.21 primitive (component) can be done to implement the present invention. For example, the MN (1012) can use an MIHF (Media Independent Handover Function) IS (Information Service) component to acquire information related to the target PoA (1010).

Figure 15:
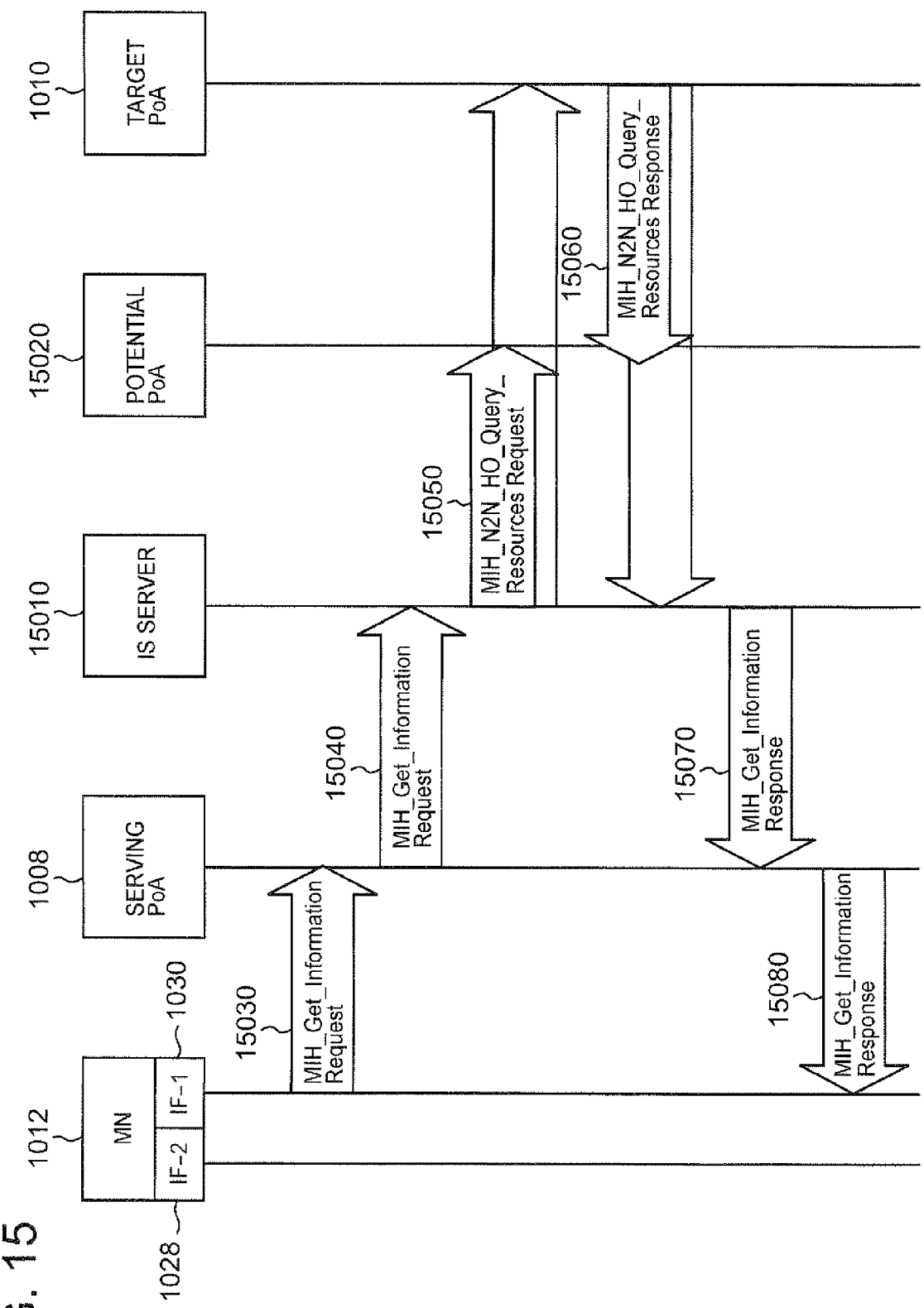
FIG. 15 a sequence chart showing an example of operation according to the seventh embodiment of the present invention.

FIG. 15 illustrates a sequence chart showing an example of call flow operation according to the seventh embodiment of the present invention. The MN (1012) transmits an MIH_Get_Information Request message (MIH getting information request message) (15030) to the serving PoA (1008). The MIH_Get_information Request message is transmitted to an IS server (15010) (15040).

The IS server (15010) can already have necessary information or may inquire of a related network node about the information. If making an inquiry, for example, an MIH_N2N_HO_Query_Resources message (MIH_N2N handover query resources message) can be used. In this case, the MIH_N2 N_HO_Query_Resources Request message is transmitted from the IS server (15010) to a potential PoA (15020) as a PoA candidate (including the target PoA (1010)) (15050). When receiving a response (MIH_N2 N_HO_Query_Resources Response message) from the network node from which the IS server (15010) is inquired, the IS server (15010) responds to the MIH_Get_information Request message (15040) (MIH getting information response message) via the serving PoA (1008) (15070, 15080).

A request for a parameter for the connection of the MN (1012) to the target PoA (1010) and a response to the request can be inserted into these messages to implement the present invention.

Eighth Embodiment

An eighth embodiment of the present invention will be described next. In the eighth embodiment of the present invention, the IS server (15010) can use an existing paging system to search for a connection parameter for the MN (1012).

In such a scenario, a new IEEE802.21 primitive may be used instead of the IF-2 (1030) of the MN (1012) to transmit a paging request to a related paging controller. For example, a security framework such as AAA (Authentication, Authorization, Accounting), which supports EAP (PPP Extensible Authentication Protocol), needs to be set appropriately to support exchange between technologies (access systems) or between domains.

The security framework enables the pre-emptive establishment of a relationship built on trust via proxy network access. For example, a security association can be established beforehand with a WiMAX (Worldwide Interoperability for Microwave Access) network to realize a seamless user experience upon shifting the session.

The paging request can be considered as the intention of the MN (1012) to connect (the MN (1012) is trying to connect). The paging controller may return a related connection parameter through a response message. Those capable of embodying this message include an IEEE802.21 paging UE_Location_Query message (paging UE location query message) used as a trigger to start paging of the MN (1012) on a target PoA (1010) network.

Figure 16:
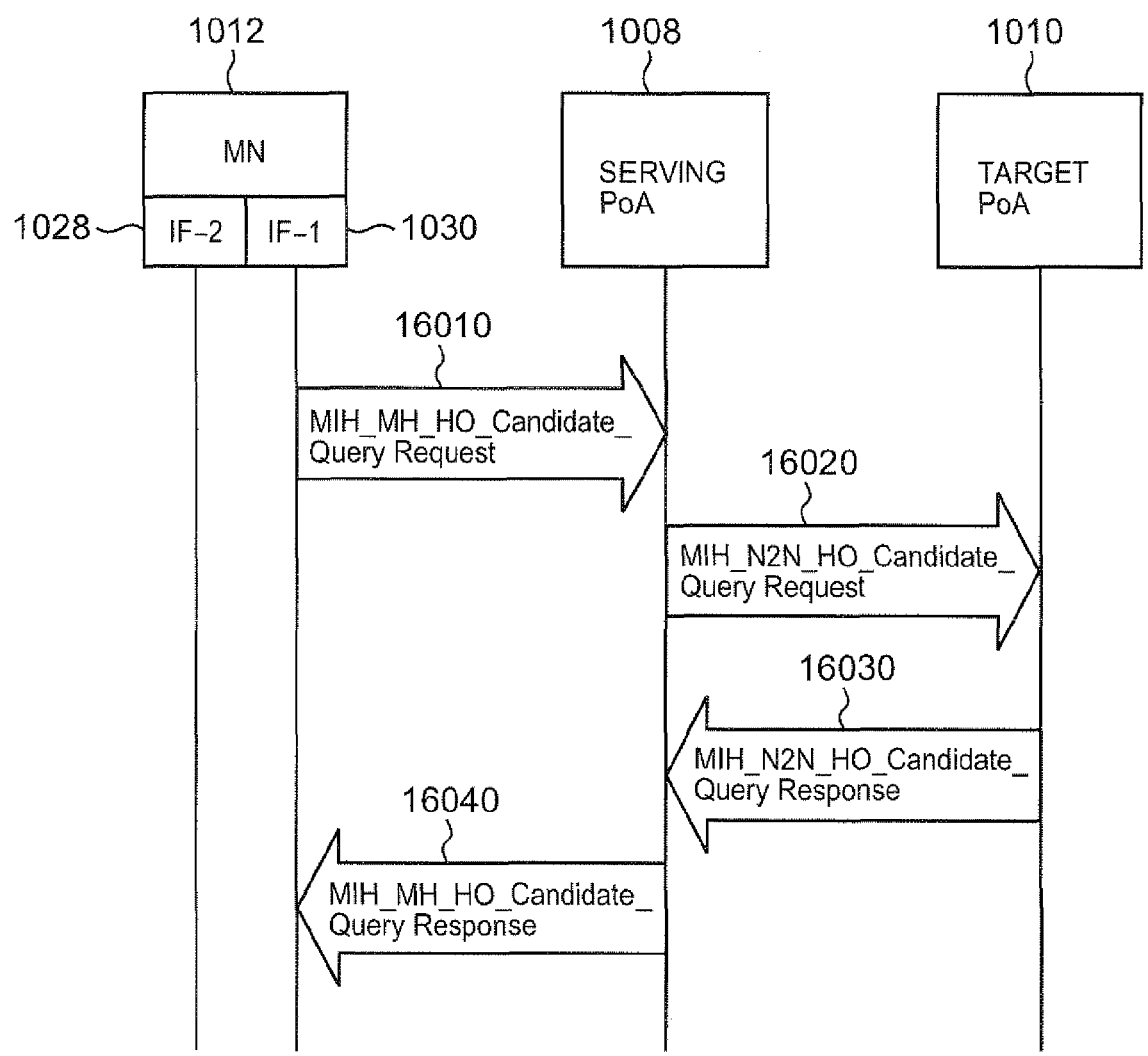
FIG. 16 a sequence chart showing an example of operation according to an eighth embodiment of the present invention.

FIG. 16 illustrates a sequence chart showing an example of scenario when the MN (1012) has already determined the specific target PoA (1010) to connect through the IF-2 (1028) in the eighth embodiment of the present invention.

The intention of the MN (1012) to connect is transmitted through an MIH_MH_HO_Candidate_Query Request message (MIH_MH handover candidate query request message) (16010). An MIH_N2N_HO_Candidate_Query Request message (MIH_N2N handover candidate query request message) (16020) may be used to relay the message between the serving PoA (1008) and the target PoA (1010).

On the other hand, the connection parameter transmitted from the target PoA (1010) may be carried, for example, through an MIH_N2N_HO_Candidate_Query Response message (MIH_N2N handover candidate query response message) (16030) from the target PoA (1010) to the serving PoA 1008, and transmitted through an MIH_MH_HO_Candidate_Query Response message (MIH_MH handover candidate query response message) (16040) from the serving PoA (1008) to the MN (1012).

Ninth Embodiment

A ninth embodiment of the present invention will be described next. In the ninth embodiment of the present invention, the intention of the MN (1012) to connect or the exchange of a connection parameter and the like from the target PoA (1010) may be transmitted using an MIH_MH_HO_Commit (MIH_MH handover commit) primitive or an MIH_N2N_HO_Commit (MIH_N2N handover commit) primitive.

Figure 17:
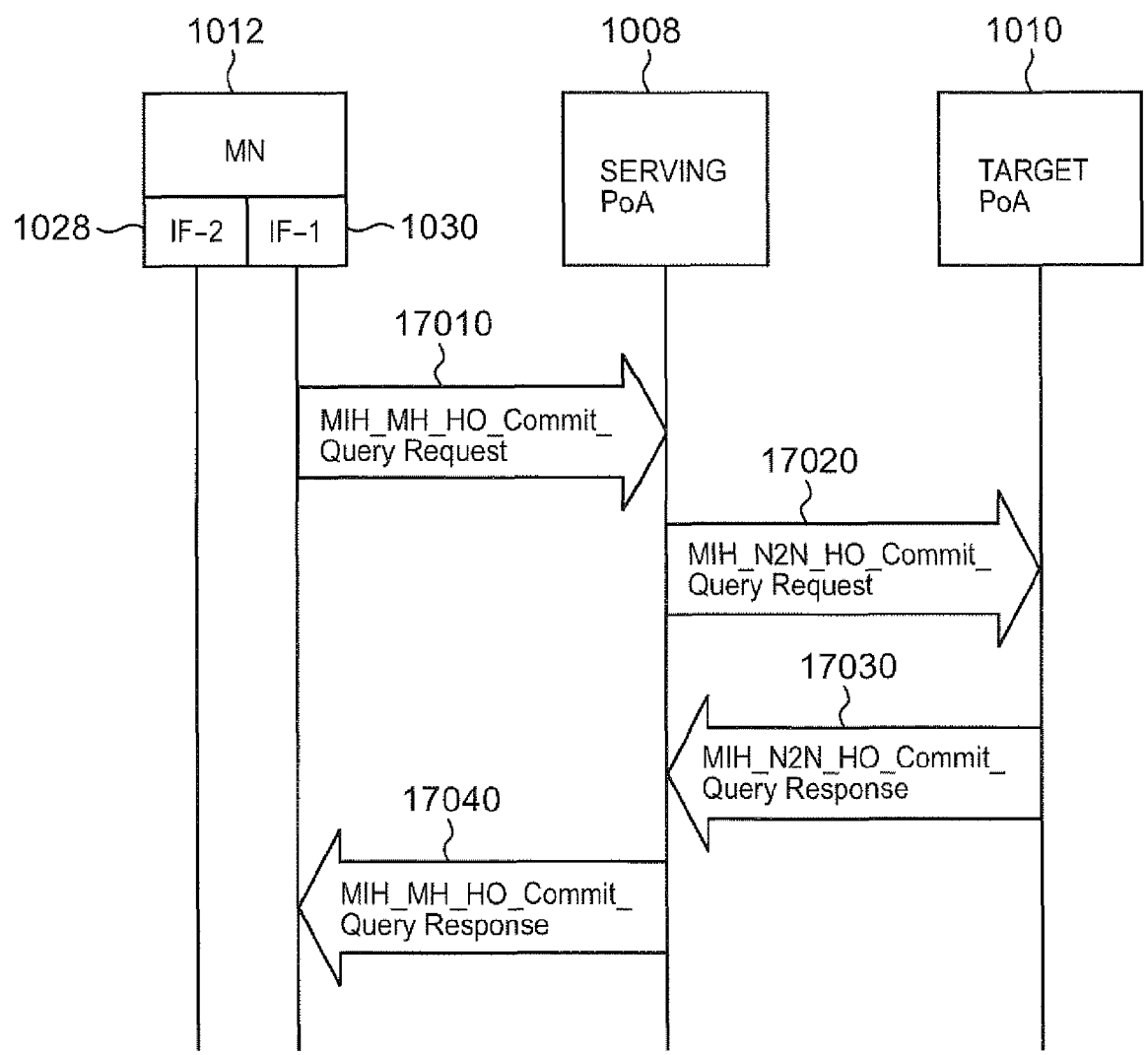
FIG. 17 a sequence chart showing an example of operation according to a ninth embodiment of the present invention.

FIG. 17 illustrates a sequence chart when the intention of connection indicating that the MN (1012) is trying to connect to the target PoA (1010) is transmitted through an MIH_MH_HO_Commit Request message (MIH_MH handover commit request message) to be transmitted to the serving PoA (1008) in the ninth embodiment of the present invention.

In FIG. 17, the intention of the MN (1012) to connect to the target PoA (1010) (indicating that the MN (1012) is going to connect to the target PoA (1010)) is transmitted through the MIH_MH_HO_Commit Request message (17010) to be transmitted to the serving PoA (1008). This intention of connection may also be transmitted from the serving PoA (1008) to the target PoA (1010) through an MIH_N2 N_HO_Commit Request message (MIH_N2N handover commit request message) (17020).

The target PoA (1010) makes a response through an MIH_N2 N_HO_Commit Response message (MIH_N2N handover commit response message) (17030) including an additional parameter (e.g., connection parameter) useful to enable the MN (1012) to connect quickly in the same manner as in the aforementioned embodiments. The additional parameter can be transmitted to the MN (1012) using an MIH_MH_HO_Commit Response message (MIH_MH handover commit response message) (17040) to be transmitted from the serving PoA (1008).

Tenth Embodiment

A tenth embodiment of the present invention will be described next. In order to achieve power savings for the MN (1012), it can be foreseen that heterogeneous paging systems can be implemented as an option based on the IEEE802.21 framework.

Figure 18:
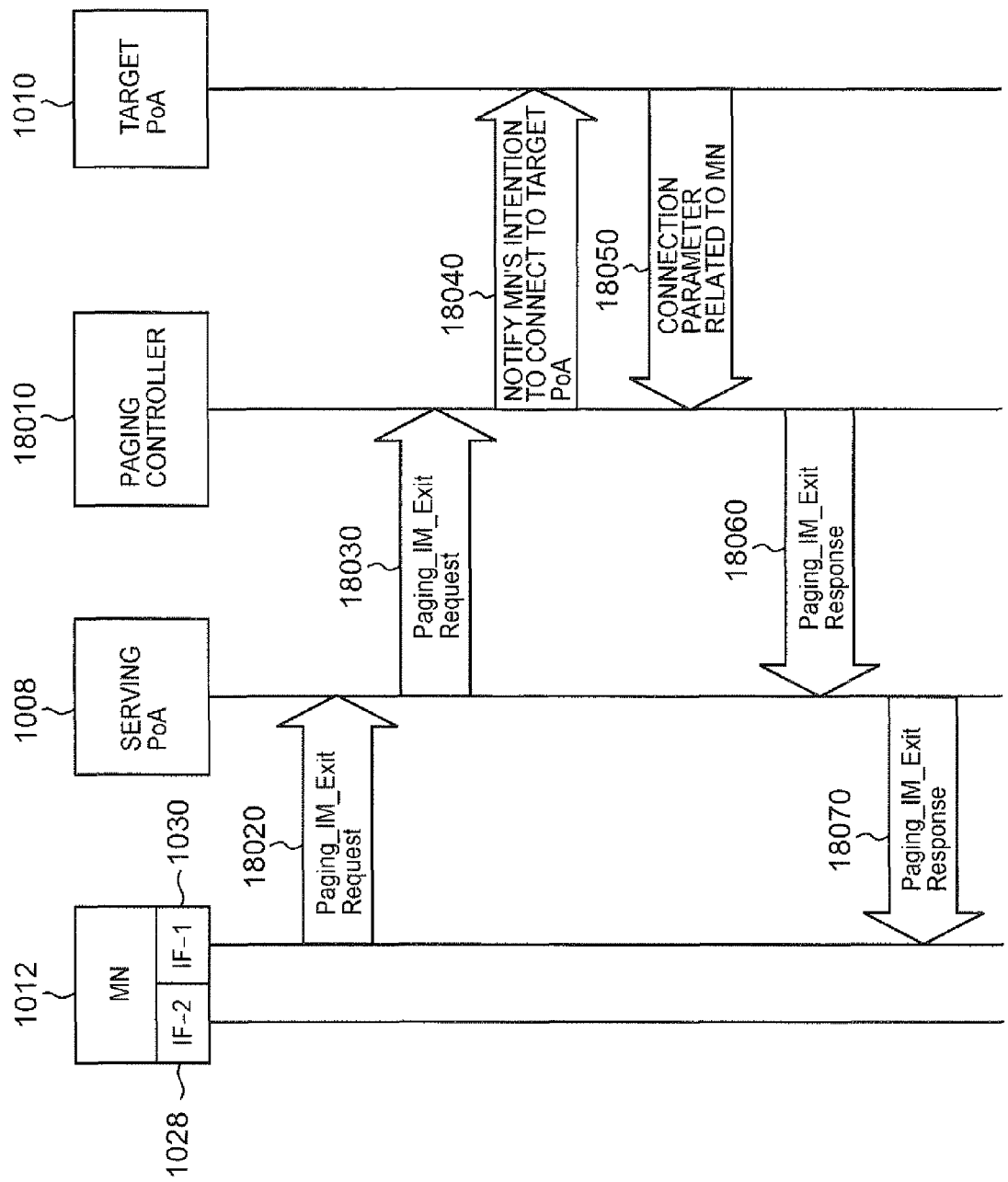
FIG. 18 a sequence chart showing an example of operation according to a tenth embodiment of the present invention.

FIG. 18 illustrates a sequence chart showing an example of operation when the IF-1 (1030) of the MN (1012) exits the idle mode to make a notification to the target PoA (1010) in the tenth embodiment of the present invention.

The MN (1012) uses a Paging_IM_Exit Request message (paging IM exit request message) (18020) to notify from the IF-1 (1030) to the network that the IF-1 (1030) of the MN (1012) is going to exit the idle mode. The serving PoA (1008) transfers this message (18030) to a paging controller (18010) managing the target PoA (1010) (16030).

At this time, the paging controller (18010) can notify the target PoA (1010) of the intention (18040) of the MN (1012) to connect. The target PoA (1010) can return, to the paging controller (18010), a connection parameter (16050) related to the MN (1012) The paging controller (18010) transmits a Paging_IM_Exit Response message (paging IM exit response message) (18060) including the connection parameter supplied from the target PoA (1010). The Paging_IM_Exit Response message (18070) including this connection parameter is further transmitted to the MN (1012) from the serving PoA (1008).

Eleventh Embodiment

Figure 19:
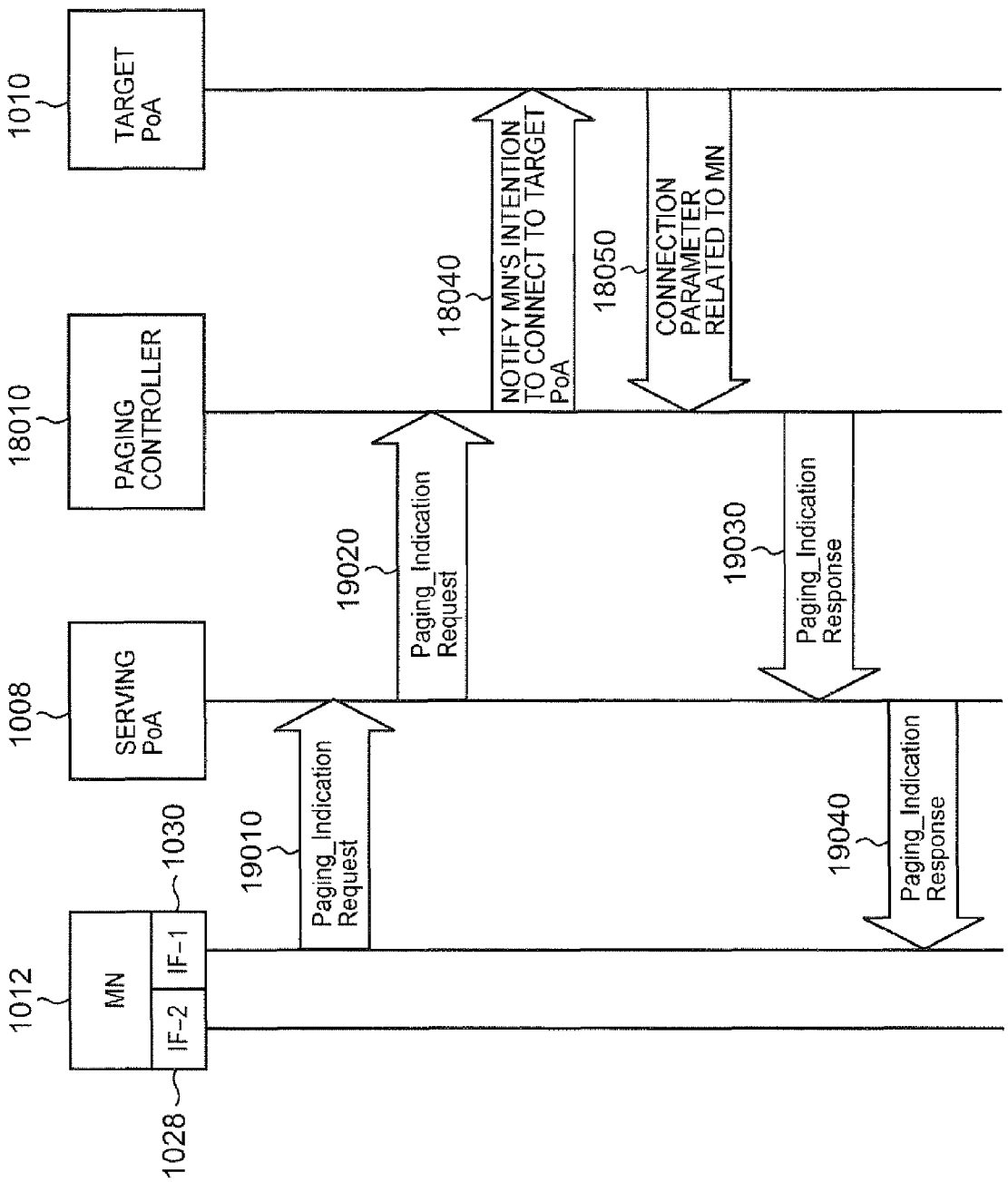
FIG. 19 a sequence chart showing an example of operation according to an eleventh embodiment of the present invention.

An eleventh embodiment of the present invention will be described next. FIG. 19 illustrates a sequence chart when the MN (1012) uses a Paging_Indication Request (paging indication request) primitive to notify the target PoA (1010) of the intention of connection in the eleventh embodiment of the present invention.

In FIG. 19, the MN (1012) transmits a Paging_Indication Request message (paging indication request message) (19010) to the network. The serving PoA (1008) transmits this Paging_Indication Request message (19020) to the paging controller (18010) responsible for the target PoA (1010).

At this time, the paging controller (18010) can notify the target PoA (1010) of the intention of the MN 1012 to connect. The target PoA (1010) can return the connection parameter (18050) for the MN (1012) to the paging controller (18010). The paging controller (18010) transmits a Paging_Indication Response message (paging indication response message) (19030) including the connection parameter supplied from the target PoA (1010). The Paging_Indication Response message (19040) including this connection parameter is further transmitted from the serving PoA (1008) to the MN (1012).

Twelfth Embodiment

Figure 20:
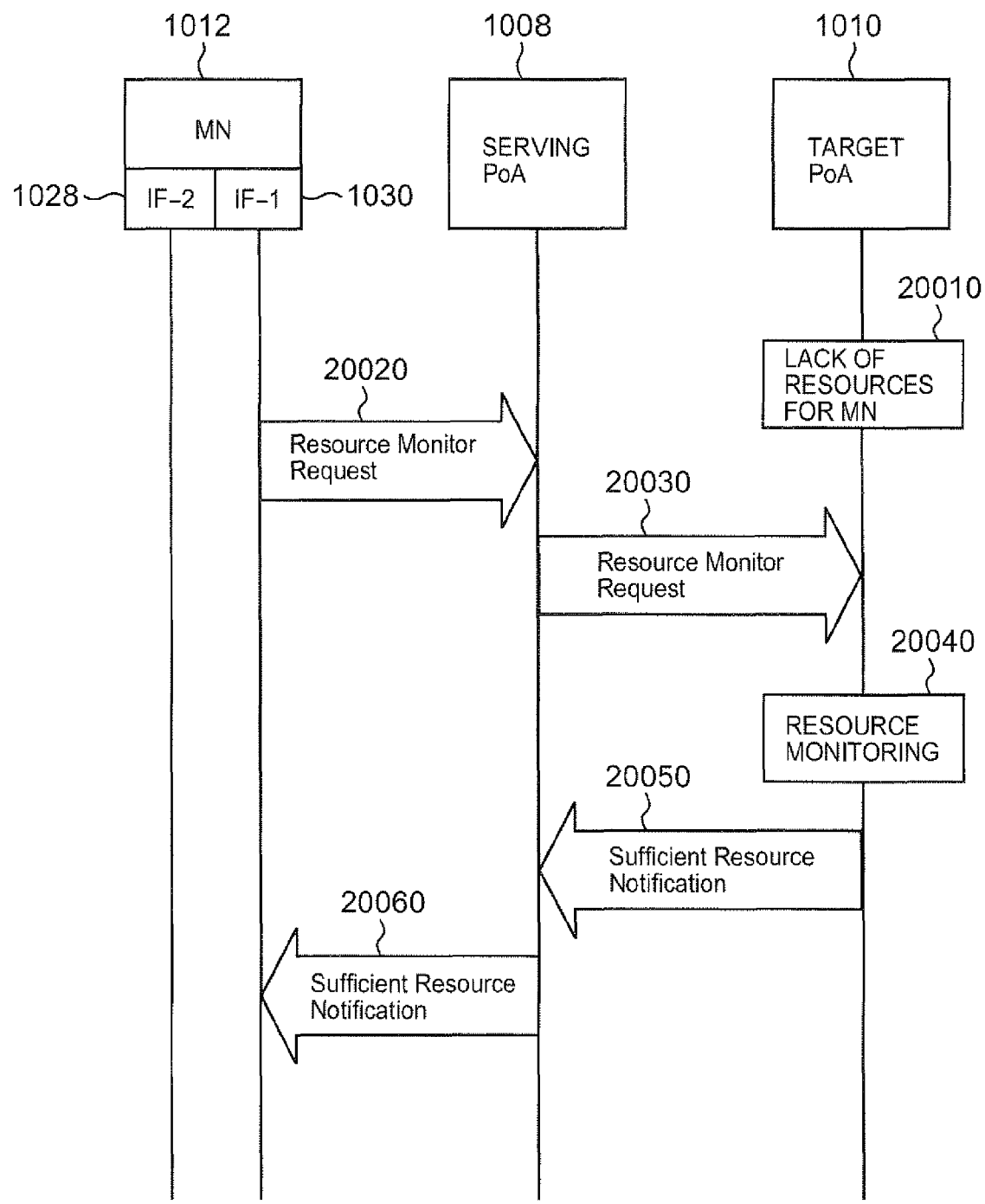
FIG. 20 a sequence chart showing an overview of operation according to a twelfth embodiment of the present invention.

A twelfth embodiment of the present invention will be described next. In the twelfth embodiment of the present invention, it is assumed that the MN (1012) desires to monitor the levels of resources in the target PoA (1010). For example, the cases where the MN (1012) desires to monitor the levels of resources in the target PoA (1010) include a case where the MN is trying to connect to the target PoA (1010) after sufficient resources become available and a case where page optimization is carried out only when a buffer becomes almost full. FIG. 20 illustrates a sequence chart showing an overview of operation according to the twelfth embodiment of the present invention.

In FIG. 20, it is assumed that, as the initial state, the target PoA (1010) is in such a state that it cannot secure resources sufficiently for the MN (1012) (or an unspecified client).

To connect to the target PoA 1010 with sufficient resources available, for example, the MN (1012) transmits a Resource Monitor Request message (resource monitoring request message) (20020) requesting monitoring of desired resources in the target PoA 1010. The serving PoA 1008 transmit, to the target PoA (1010), this Resource Monitor Request message (20030) requesting monitoring of a required resource level.

The target PoA (1010) that has received this message performs resource monitoring (20040), and when resources exceeding the resource level necessary for the MN (1010) (required resource level) become available, it transmits, to the MN (1012), a notification (Sufficiet Resource Notification) (20050) that the desired level of resources can be obtained. This notification messages (Sufficiet Resource Notification) (20060) is relayed via the serving PoA (1008) and transmitted to the MN (1012). Thus, the use of messages exchanged between the MN (1012) and the target PoA (1010) allows the MN (1012) to acquire the connection parameter.

Figure 21:
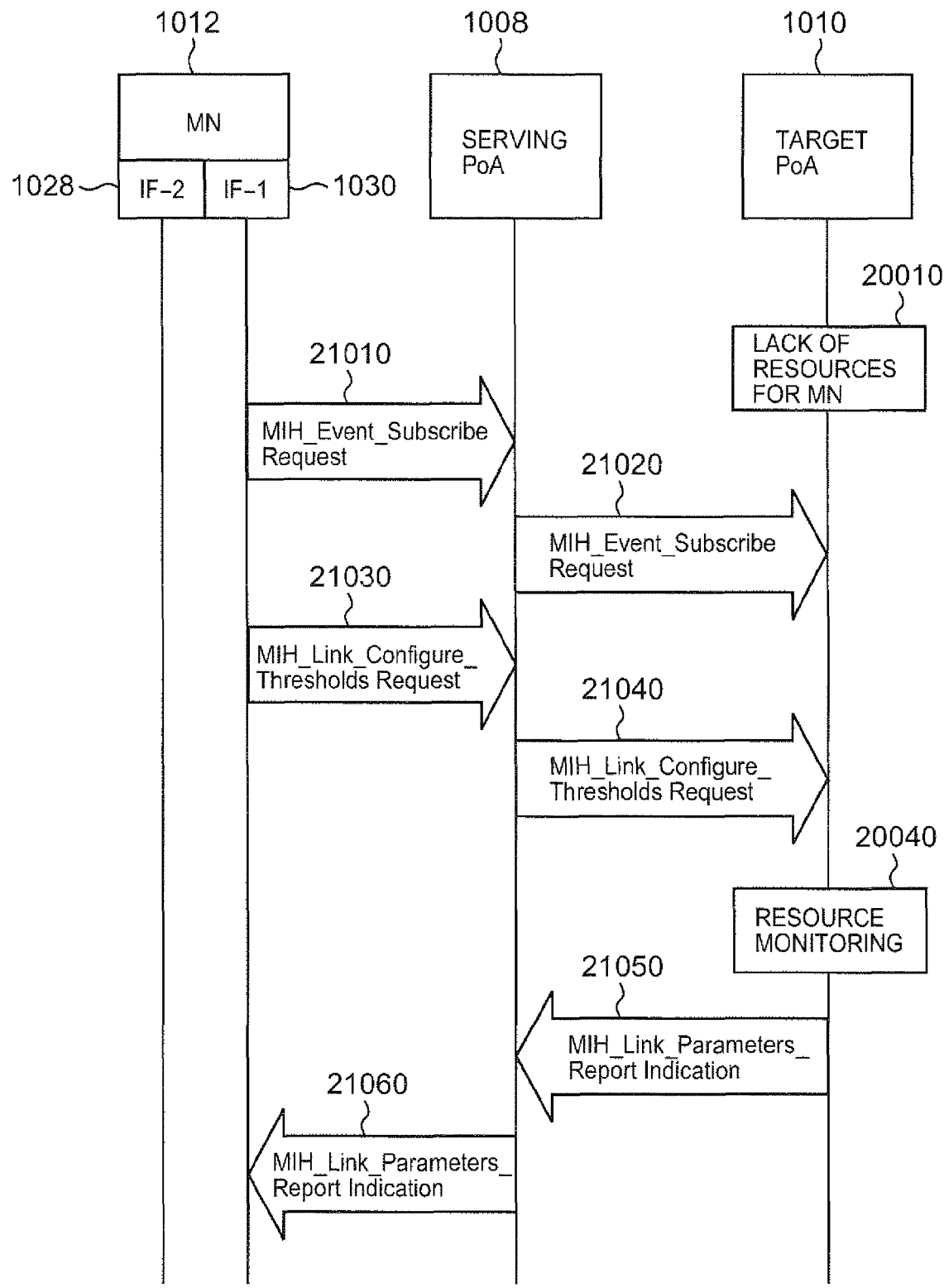
FIG. 21 a sequence chart showing the example of operation according to the twelfth embodiment of the present invention.

The implementation of the embodiment shown in FIG. 21 makes it possible to use the features of the present invention in the IEEE802.21 framework. In FIG. 21, as the initial state, it is assumed that the target PoA (1010) is also in such a state that it cannot secure resources sufficiently for the MN (1012) (or unspecified client).

The MN (1012) first transmits an MIH_Event_Subscribe Request message (MIH event subscription request message) (21010) to specify resources to be monitored. The MIH_Event_Subscribe Request message is transmitted from the serving PoA (1008) to the target PoA (1010) (21020).

Next, the MN (1012) transmits an MIH_Link_Configure_Thresholds Request message (MIH link configuration threshold request message) (21030) to set a desired threshold level for the resources to be monitored. This MIH_Link_Configure_Thresholds Request message is also transferred to the target PoA (1010) through the serving PoA (1008) (21040).

The target PoA (1010) performs resource monitoring (20040), and when resources exceeding the resource level necessary for the MN (1010) (required resource level) become available, it transmits, to the MN (1012), a notification (MIH_Link_Parameters_Report Indication) (21050) that the desired level of resources can be obtained. This notification message (MIH_Link_Parameters_Report Indication) (21060) is relayed via the serving PoA (1008) and transmitted to the MN (1012).

Thirteenth Embodiment

A thirteenth embodiment of the present invention will be described next. In the thirteenth embodiment of the present invention, the MN (1012) uses an MIH_Link_Actions primitive (MIH link action primitive) to request the target PoA (1010) to start paging processing when the resource level exceeds a necessary threshold, for example, making it also possible to achieve information exchange according to the present invention.

Fourteenth Embodiment

A fourteenth embodiment of the present invention will be described next. In the fourteenth embodiment of the present invention, the target PoA (1010) may take the initiative in performing processing to make a notification to the MN (1012) using an appropriate primitive specified in IEEE802.21. Examples of processing in which the target PoA (1010) takes the initiative include adjustment of beacon broadcast parameters such as the beacon period and the amount of information on the beacon, advance resource and QoS reservation, a security mechanism operation, optimization, etc.

Fifteenth Embodiment

Figure 22:
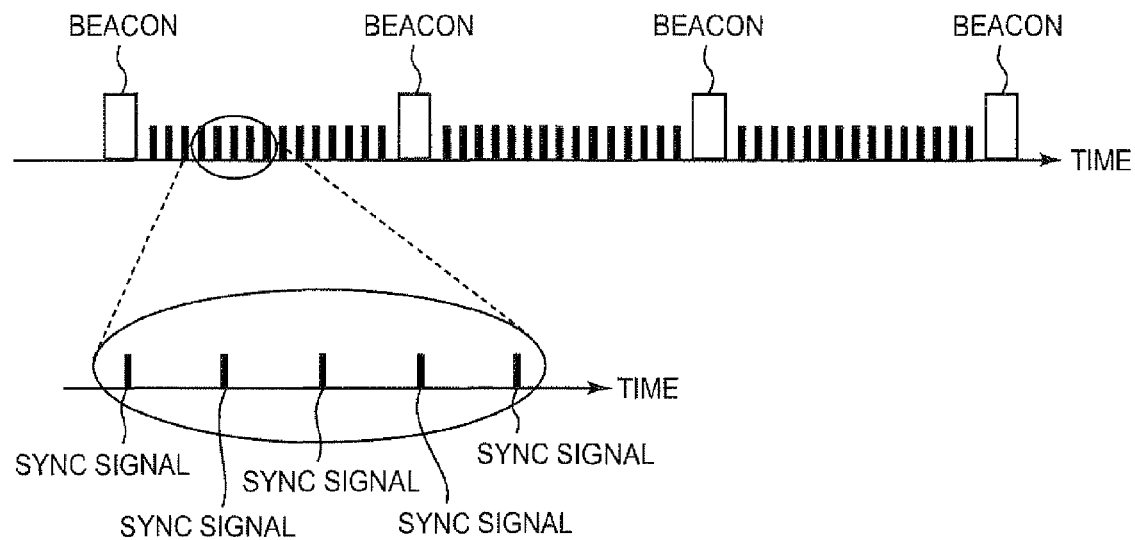
FIG. 22 a diagram showing a difference in scale between beacon timing and synchronization timing according to a fifteenth embodiment of the present invention.

For example, as shown in FIG. 22, it is considered that the timing (synchronization timing) of a sync signal to be transmitted for device synchronization in a physical layer exists on a finer scale (or, conversely, on a lager scale) than the timing of a beacon (beacon timing) to be controlled in a MAC layer and transmitted for access system synchronization.

The synchronization timing in each layer varies from layer to layer. From the standpoint of synchronization timing necessary for each layer of the PoA, not only is the present invention applied to the paging function of notifying beacon timing as shown in the aforementioned embodiments, but also can the present invention be applied to the paging function of notifying the synchronization timing of a target PoA at a serving PoA as will be described in the fifteenth embodiment. The following describes an example of operation when the synchronization timing of the target PoA at the serving PoA is notified in the fifteenth embodiment of the present invention.

For example, although there is a difference in time scale or in control layer between beacon timing and synchronization timing, both appear to be identical in terms of being information or signal broadcast periodically from the network side (not on a strictly constant basis, including a case where the broadcasting period may have some error within a range acceptable to the system), so that the present invention can be applied not only to the beacon timing but also to the synchronization timing.

The number of connectable terminals (MNs) is adjusted between base stations/access points that can be PoAs so that they may have a relationship capable of balancing the processing load or the service area of each PoA and selectively managing the terminals (priority control, etc.). An example of having such a relationship between PoAs is an LTE/SAE (Long Term Evolution/System Architecture Evolution) system in 3GPP (3rd Generation Partnership Project).

Figure 23:
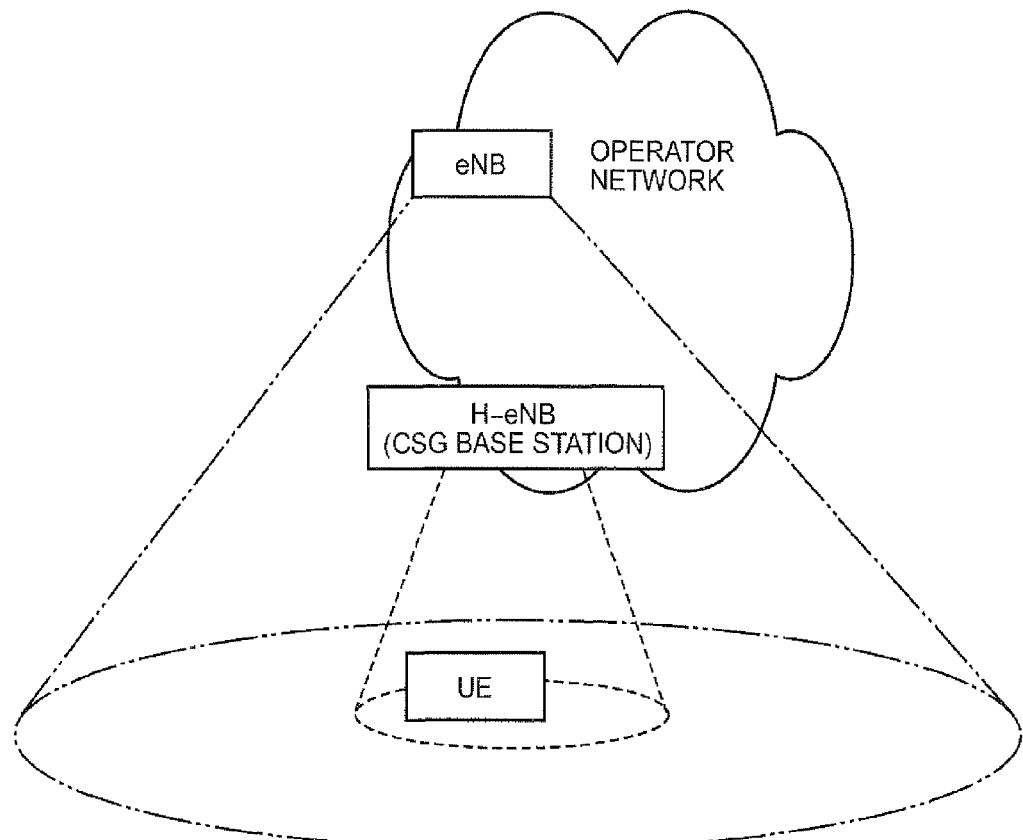
FIG. 23 a diagram showing an example of an LTE/SAE system according to the fifteenth embodiment of the present invention.

FIG. 23 shows an example of the LTE/SAE system according to the fifteenth embodiment of the present invention. As shown in FIG. 23, in the LTE/SAE system, the installation of small-cell radio communication base station equipment (H-eNB: Home Evolved NodeB) with a cell radius of about several tens of meters, called Femto cell, in indoor facilities such as homes, offices, and restaurants, in addition to macro-cell radio communication base station equipment (eNB: Evolved NodeB) mainly installed outdoors have been examined. The small-cell radio communication base station equipment examined in 3GPP is considered to permit only limited group members to access. Such a cell is called a closed subscriber group (CSG) cell.

Radio communication equipment (UE: User Equipment) permitted to access is controlled from the network to connect preferentially to the radio communication base station equipment (hereinafter referred to as CSG base station) that forms a CSG cell. In other words, when any UE enters the CSG base station area, the connection of the UE to the CSG base station is controlled according to the priority even if it can receive radio waves from the eNB. Non-Patent Document 2 and Non-Patent Document 3 disclose the LTE/SAE system in 3GPP, for example.

In a system like the above-mentioned LTE/SAE system, as a method of controlling the allocation of terminals to each base station (as to which base station each terminal should be connected to), for example, there is a method under which a base station approaching its upper limit on the number of accommodated terminals controls transmission of a sync signal (method of suppressing transmission of a sync signal). There are various kinds of methods of broadcasting the sync signal and their purposes differ. However, if the transmission of the sync signal with respect to the base station at a relatively early stage is suppressed, since a terminal cannot be synchronized with a base station when newly connecting to the base station (when searching for a connectable base station), the terminal cannot connect to the base station or cannot find out the base station.

As mentioned above, since the transmission of the sync signal is thus suppressed at a specific base station, it can control a terminal newly trying to connect (at an earlier stage than the authentication level) not to be able to connect to this specific base station. Even if the transmission of the sync signal from the base station is suppressed, terminals that have already established connections to this base station can maintain the timings (or receive fine-turned sync signals referable after synchronization with the base station is established) to maintain the connections. However, once a terminal loses synchronization with the base station, such as upon termination of active communication or transmission/reception, the terminal cannot establish synchronization with the base station like an unconnected terminal. Thus, when the transmission of the sync signal from the base station is suppressed, the number of accommodated terminals of the base station (i.e., congestion) is reduced as the terminals that terminate the communication leave the base station sequentially.

However, it can be considered that, if a control terminal (e.g., a terminal of the owner of a CSG base station) terminates communication with the CSG base station while controlling group members at the above-mentioned CSG base station, for example, the control terminal will not be able to connect directly to the CSG base station from then on. In other words, even the control terminal cannot receive any sync signal from the CSG base station like the other terminals, and hence cannot reestablish synchronization with the CSG base station.

Therefore, the control terminal needs to carry out communication via the macro-cell radio communication base station equipment (eNB), for example, in order to control the network managed by the control terminal. The control terminal may be able to cancel the suppression of transmission of the sync signal via the eNB. In this case, however, the other terminals (the terminals controlled not to be able to connect to this CSG base station) can also detect the sync signal and hence may be able to connect to the CSG base station at the same time as the time when the suppression of transmission of the sync signal is cancelled, ending up in a state undesirable from the standpoint of terminal management.

Even when the suppression of transmission of the sync signal is thus being performed at the CSG base station, the present invention can be employed to allow a specific terminal (e.g., control terminal) to receive, from a serving PoA (eNB), a notification of the synchronization timing of a target PoA (CSG base station) so that the specific terminal can connect to the target PoA.

For example, the most typical method in the case of use of the present invention is to notify, from the serving PoA (i.e., via the serving PoA), transmission timing of a sync signal for fine-turned synchronization confirmable after initial synchronization with the target PoA is established. According to this method, the control terminal that can connect to only the serving PoA first requests, via the serving PoA, information related to synchronization necessary for connection establishment to the target PoA. The information related to the synchronization is, for example, a timing trigger including information necessary to receive a fine-tuned sync signal of the target PoA.

After completion of necessary confirmation on the network side, the target PoA (or the serving PoA itself) transmits the information related to the synchronization via the serving PoA. This allows the control terminal to receive the fine-tuned sync signal transmitted from the target PoA based on the information related to the synchronization received via the serving PoA in order to establish a connection to the target PoA in such a state that the transmission of the sync signal from the target PoA remains suppressed.

If it is difficult to receive the fine-tuned sync signal in a state where initial synchronization is not established, the control terminal can first request not only transmission of the sync signal from the target PoA via the serving PoA for a fixed period (fixed number of times) as an alternative, but also the timing trigger including information necessary to receive the sync signal.

After completion of necessary confirmation on the network side, the target PoA (or serving PoA itself) transmits a trigger to the control terminal via the serving PoA at the same timing as the transmission of the sync signal from the target PoA. Thus, the control terminal receives the sync signal from the target PoA in tune with the reception of the trigger so that the control terminal can establish a connection to the target PoA. At this time, since the target PoA transmits the sync signal in a limited way only to make the control terminal connectable, the possibility of allowing the other terminals, which do not know the limited timing of transmission of the sync signal, to detect the sync signal can be reduced. Thus, only the control terminal is allowed to connect, and this can maintain the maximum effectiveness of the transmission suppression of the sync signal.

In an actual system, since a terminal trying to establish synchronization with the base station is less likely to establish synchronization based on reception of a single sync signal, it can be considered that the terminal establishes synchronization when entering a sufficient reception state (synchronous state) after receiving the sync signal plural times.

Various criteria can be adopted to judge whether the terminal has entered a sufficient synchronous state, such as received power, the number of consecutive times the sync signal is received, comparison of a cycle-related parameter with a threshold, etc. The following describes a model as a judgment mode in which synchronization establishment is considered successful when three out of four attempts to receive the sync signal at appropriate timing as the transmission cycle of the sync signal were correct. According to this judgment model, only the control terminal can be connected to the target PoA while suppressing the connections of the other terminals to the target PoA.

Thus, when receiving a request for transmission of the sync signal from an appropriate control terminal, the target PoA starts transmission of the sync signal at such a frequency that normal terminals (non-priority terminals that cannot eventually obtain permission to connect) do not satisfy the criterion even if they try to establish synchronization, and notifies, via the serving PoA, the appropriate control terminal (the terminal preferentially permitted to connect) of the timing of transmission of the sync signal from the target PoA.

For example, this notification may be made by transmitting, from the serving PoA, a trigger in tune with the timing of transmission of the sync signal from the target PoA, or by passing, to the control terminal, a trigger including information (transmission pattern information) such as the absolute time or relative time (elapsed time since transmission of a predetermined signal of the serving PoA). Further, the target PoA may start transmission of the sync signal in response to a transmission request from the control terminal, or if the sync signal is transmitted in a transmission pattern that normal terminals cannot use as the sync signal (i.e., with a frequency that does not satisfy the criterion for establishing synchronization), the target PoA may transmit the sync signal independently of the transmission request from the control terminal.

Figure 24:
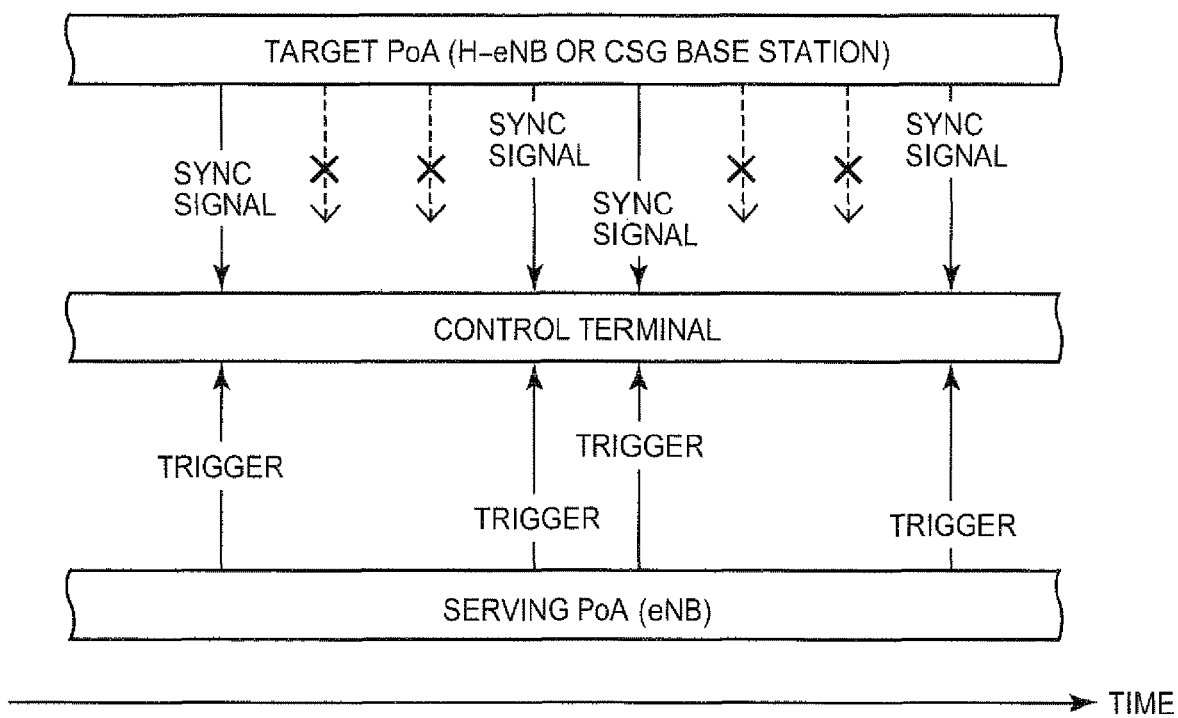
FIG. 24 a schematic diagram showing an example of a judgment model according to the fifteenth embodiment of the present invention.

FIG. 24 is a diagram schematically showing an example of the judgment model according to the fifteenth embodiment of the present invention. FIG. 24 shows timings at which the control terminal receives signals from the target PoA and the serving PoA. For example, as shown in FIG. 24, the control terminal receives, from the serving PoA, a trigger indicative of the timing of transmission of the sync signal from the target PoA so that the control terminal can detect and receive the sync signal from the target PoA at the timing of receiving this trigger. Then, for example, when succeeding in receiving the sync signal from the target PoA three consecutive times, the control terminal can complete the establishment of synchronization with the target PoA. In the judgment model of FIG. 24, since normal terminals (terminals which are not permitted to connect to the target PoA) are not aware of the transmission pattern of the sync signal from the target PoA, they assume a transmission pattern in which the sync signal is transmitted at regular intervals, and this makes it impossible for the normal terminals to receive the sync signal three consecutive times. Thus, the normal terminals cannot establish synchronization with the target PoA, and only the control terminal that is aware of the transmission pattern of the sync signal from the target PoA can establish synchronization with the target PoA.

Thus, only the control terminal succeeds, with a high frequency, in receiving the sync signal transmitted from the target PoA with the synchronization timing that the normal terminals cannot use as the sync signal, enabling prompt completion of the establishment of synchronization with the target PoA.

The above description takes as an example the control terminal, such as the terminal of the owner of the CSG base station, as a terminal particularly desired to connect to the CSG base station, but any radio communication terminal can be selectively connected according to the present invention.

Further, in the above judgment model, the establishment of synchronization is considered complete when the control terminal succeeds in receiving the sync signal predetermined times equal to or more than a threshold value (three times as an example) out of a predetermined number of transmissions of the sync signal (four times as an example), but the judgment criterion is not limited to the number of receptions of the sync signal. If any parameter meets a certain criteria, the establishment of synchronization can be considered complete, such as a case where the establishment of synchronization is considered complete when the magnitude of average received power exceeds a threshold.

In the example of the CSG base station in the LTE/SAE system, either or both of P-SS (Primary Synchronization Signal) and S-SS (Secondary Synchronization Signal) can be considered as the sync signal with the base station at a relatively early stage, Further, P-SS can be used as a sync signal with the base station at the relatively early stage and S-SS can be used as a fine-tuned sync signal.

In each of the aforementioned embodiments, the MN has two interfaces (IF-1 and IF-2), but the present invention can also be applied to a case with three or more interfaces. The present invention is basically such that one of the plural interfaces is in a connected state (being connected to the serving PoA), and information exchange is performed via the serving PoA when trying to establish the connection of another interface (to the target PoA), making an efficient connection to the target PoA. In other words, the MN is configured to improve the connection efficiency of one path via the other path different in space and frequency.

On the other hand, there exist plural paths for the MN, which vary in time from one another as well as in space and frequency. In other words, the MN can also exchange information via a path connected at a certain time to improve connection efficiency at another time (for subsequent connection). The present invention is also applicable to a case where there exist plural paths varying in time as well as the case there exist plural paths varying in space and frequency. In the case where there exist plural paths varying in time, it is apparent that the MN does not always need to have plural interfaces. In other words, in the case of the application to the case where there exist plural paths varying in time, the present invention can also be applied to an MN having only one interface. Further, the description was made on the precondition that the number of network interfaces for the MN is two or more, but the number of logical interfaces can be two or more in the practice of the present invention. For example, one radio section can be shared among plural connection modes in such a manner to switch over among them at such a speed that does not pose a problem in terms of network interface or to keep logical links in layer 2 so that the MN can operate in the same manner as the case where the network section connects to a network through plural interfaces.

Note that each of the functional blocks used in describing each of the aforementioned embodiments is implemented as an LSI (Large Scale Integration) typified by an integrated circuit. Each of them may be made up of one chip individually, or they may be made up of one chip to include some or all of them. Here, although the LSI is assumed, it may be called an IC (Integrated Circuit), a system LSI, a super LSI, or an ultra LSI depending on the degree of integration.

Further, the technique for creation of an integrated circuit is not limited to LSI, and it may be implemented by a dedicated circuit or a general-purpose processor. An FPGA (Field Programmable Gate Array) capable of programming after LSI manufacturing or a reconfigurable processor capable of reconfiguring connections or settings of circuit cells within the LSI may also be employed.

In addition, if integrated circuit technology capable of replacing LSI emerges with development of semiconductor technology or another technology derived therefrom, the technology may be used to integrate the functional blocks. For example, applications of biotechnology may be possible.

INDUSTRIAL APPLICABILITY

The present invention has the advantages of reducing delay when a mobile communication terminal starts communication and reducing consumption of a power resource of the mobile communication terminal. The present invention can be applied to communication technology for connection through wireless media, and particularly to communication technology for a mobile communication terminal to carry out communication using plural network interfaces.

The invention claimed is:

1. A mobile communication terminal comprising:
an interface for connecting to a network through radio communication;
a request message transmitting unit configured to transmit, via the interface being connected to a first access node and via the first access node, a request message to a second access node requesting the second access node to prepare for a handover to the second access node;
a response message receiving unit configured to receive, via the first access node, a response message as a response to the request message, the response message including time information indicating absolute transmission time of a sync signal for paging transmitted from the second access node, and
a connecting unit configured to cause connection to the second access node based on the time information,
wherein power supply to said interface to connect to the second access node is limited until the absolute transmission time specified by the time information.

2. The mobile communication terminal according to claim 1, further comprising a plurality of interfaces for connection to the network through radio communication, wherein the connecting unit causes connection to the second access node through an interface different from the interface being connected to the first access node.

3. The mobile communication terminal according to claim 1, wherein the request message is a message for notifying the intention of the mobile communication terminal to connect.

4. The mobile communication terminal according to claim 3, wherein the message for notifying the intention of the mobile communication terminal to connect is embodied based on IEEE802.21 specification.

5. The mobile communication terminal according to claim 1, wherein the request message is a message for requesting monitoring of resources available for the mobile communication terminal.

6. The mobile communication terminal according to claim 5, wherein the message for requesting monitoring of resources available for the mobile communication terminal is embodied based on IEEE802.21 specification.

7. The mobile communication terminal according to claim 1, wherein the sync signal is transmitted from the second access node at timing corresponding to the time information.

8. A communication device functioning as a first access node, comprising:
a request message transferring unit configured to transfer a request message transmitted from a mobile communication terminal, to which the first access node is connected, to a second access node, the request message requesting the second access node to prepare for a handover to the second access node; and
a response message transferring unit configured to transfer a response message transmitted from the second access node to the mobile communication terminal as a response to the request message, the response message including time information indicating absolute transmission time of a sync signal for paging transmitted from the second access node to permit the mobile communication terminal to connect to the second access node,
wherein an interface of the mobile communication terminal for connecting to the second access node is woken up by power supply at the absolute transmission time specified by the time information.

9. The communication device according to claim 8, wherein the request message instructs the second access node to narrow a beacon transmission interval when the mobile communication terminal attempts to connect to the second access node.

10. The communication device according to claim 8, wherein there exist plural candidates for the second access node, to which the mobile communication terminal attempts to connect, and the response message from each of the candidates for the second access node includes specific timing information usable for the mobile communication terminal to connect to each of the candidates for the second access node, the communication device functioning as the first access node further comprising:
a conflict checking unit configured to check whether pieces of the specific timing information, each being set by each of the plural candidates for the second access node, overlap at a simultaneous period; and
a reconfiguration requesting unit configured to request, when the pieces of the specific timing information set by the candidates for the second access node overlap at the simultaneous period, one of those candidates for the second access node to reconfigure the specific timing information.

11. The communication device according to claim 8, wherein the response message is a message including a connection parameter for the mobile communication terminal.

12. The communication device according to claim 11, wherein the message including the connection parameter for the mobile communication terminal is embodied based on IEEE802.21 specification.

13. The communication device according to claim 8, wherein the response message is a message for notifying that resources necessary for the mobile communication terminal are available.

14. The communication device according to claim 13, wherein the message for notifying that resources necessary for the mobile communication terminal are available is embodied based on IEEE802.21 specification.

15. The communication device according to claim 8, wherein the sync signal is transmitted from the second access node at timing corresponding to the time information.

16. A communication device functioning as a second access node, comprising:
 a request message receiving unit configured to receive, via a first access node, a request message transmitted from a mobile communication terminal, to which the first access node is connected, the request message requesting the second access node to prepare for a handover to the second access node;
 a response message transmitting unit configured to transmit a response message, as a response to the request message, to the mobile communication terminal via the first access node, the response message including time information indicating absolute transmission time of a sync signal for paging transmitted from the second access node; and
 a connecting unit configured to connect to the mobile communication terminal based on the time information,
 wherein power supply to an interface of the mobile communication terminal to connect to the second access node is limited until the absolute transmissino time specified by the time information.

17. The communication device according to claim 16, wherein the connecting unit transmits the sync signal at timing corresponding to the time information.

18. A method for a mobile communication terminal to perform a handover, the mobile communication terminal including an interface for connecting to a network through radio communication, the method comprising the steps of:
 transmitting, via the interface being connected to a first access node and via the first access node, a request message to a second access node requesting the second access node to prepare for a handover to the second access node,
 receiving, via the first access node, a response message as a response to the request message, the response message including time information indicating absolute transmission time of a sync signal for paging transmitted from the second access node, and
 connecting to the second access node based on the time information,
 wherein said interface of the mobile communication terminal for connecting to the second access node is woken up by power supply at the absolute transmission time specified by the time information.

\* \* \* \* \*